(12) United States Patent
Hall et al.

(10) Patent No.: US 11,123,643 B2
(45) Date of Patent: Sep. 21, 2021

(54) METHOD AND SYSTEM FOR MATCHMAKING CONNECTIONS WITHIN A GAMING SOCIAL NETWORK

(71) Applicant: Zynga Inc., San Francisco, CA (US)

(72) Inventors: Shane Hall, San Francisco, CA (US); Daniel McCaffrey, San Bruno, CA (US); Dylan Sproule, San Francisco, CA (US); Ben Hall, Fairfield, CA (US); Timothy J. O. Catlin, San Mateo, CA (US); Jason Paul Allen, Seattle, WA (US); Clayton Rhodes Stark, Victoria (CA)

(73) Assignee: Zynga Inc., San Francisco, CA (US)

( * ) Notice: Subject to any disclaimer, the term of this patent is extended or adjusted under 35 U.S.C. 154(b) by 1 day.

(21) Appl. No.: 16/577,659

(22) Filed: Sep. 20, 2019

(65) Prior Publication Data
US 2020/0009462 A1     Jan. 9, 2020

Related U.S. Application Data

(63) Continuation of application No. 15/637,341, filed on Jun. 29, 2017, now Pat. No. 10,463,972, which is a
(Continued)

(51) Int. Cl.
*A63F 13/795* (2014.01)
*A63F 13/335* (2014.01)
(Continued)

(52) U.S. Cl.
CPC ............ *A63F 13/795* (2014.09); *A63F 13/00* (2013.01); *A63F 13/335* (2014.09); *A63F 13/35* (2014.09);
(Continued)

(58) Field of Classification Search
CPC .......... A63F 13/32; A63F 13/48; A63F 13/49; A63F 13/795; A63F 13/798
See application file for complete search history.

(56) References Cited

U.S. PATENT DOCUMENTS

| | | |
|---|---|---|
| 3,504,912 A | 4/1970 | Jenney |
| 5,830,067 A | 11/1998 | Graves et al. |
| (Continued) | | |

FOREIGN PATENT DOCUMENTS

WO     WO-2013016687 A1     1/2013

OTHER PUBLICATIONS

"U.S. Appl. No. 13/077,690, Examiner Interview Summary dated Nov. 14, 2012", 3 pgs.
(Continued)

*Primary Examiner* — James S. McClellan
(74) *Attorney, Agent, or Firm* — Schwegman Lundberg & Woessner, P.A.

(57) ABSTRACT

Techniques for recommending and establishing connections between users within a gaming social network, designed for connecting users having common gaming interests or characteristics. Embodiments include methods for recommending connections from members of an out-of-game social network, the gaming social network, and gaming activity participants; evaluating user profile information and user characteristics in a gaming social network and gaming activity in a game networking system to determine an appropriate set of connections for a selected user; and presenting graphical user interface content and configurations to enable the suggestion, review, and accepting of recommended connections in the gaming social network.

19 Claims, 19 Drawing Sheets

Related U.S. Application Data continuation of application No. 15/075,943, filed on Mar. 21, 2016, now Pat. No. 9,700,803, which is a continuation of application No. 13/560,838, filed on Jul. 27, 2012, now Pat. No. 9,289,686.

(60) Provisional application No. 61/605,606, filed on Mar. 1, 2012, provisional application No. 61/512,772, filed on Jul. 28, 2011.

(51) Int. Cl.
    *A63F 13/00*     (2014.01)
    *A63F 13/35*     (2014.01)
    *A63F 13/87*     (2014.01)

(52) U.S. Cl.
    CPC ........ *A63F 13/87* (2014.09); *A63F 2300/556* (2013.01); *A63F 2300/558* (2013.01); *A63F 2300/807* (2013.01)

(56) References Cited

U.S. PATENT DOCUMENTS

| | | |
|---|---|---|
| 5,970,479 A | 10/1999 | Shepherd |
| 6,024,643 A | 2/2000 | Begis |
| 6,042,477 A | 3/2000 | Addink |
| 6,106,395 A | 8/2000 | Begis |
| 6,128,660 A | 10/2000 | Grimm et al. |
| 6,134,590 A | 10/2000 | Perlman |
| 6,306,038 B1 | 10/2001 | Graves et al. |
| 6,345,297 B1 | 2/2002 | Grimm et al. |
| 6,641,481 B1 | 11/2003 | Mai et al. |
| 6,678,673 B1 | 1/2004 | Eves et al. |
| 6,793,580 B2 | 9/2004 | Sinclair et al. |
| 7,240,093 B1 | 7/2007 | Danieli et al. |
| 7,278,921 B1 | 10/2007 | Fujisawa et al. |
| 7,281,215 B1 | 10/2007 | Canfield et al. |
| 7,313,594 B2 | 12/2007 | Murakami et al. |
| 7,386,798 B1 | 6/2008 | Heikes et al. |
| 7,512,653 B2 | 3/2009 | Krishnasamy et al. |
| 7,614,955 B2 | 11/2009 | Farnham et al. |
| 7,818,399 B1 | 10/2010 | Ross, Jr. et al. |
| 7,819,749 B1 | 10/2010 | Fish et al. |
| 8,019,692 B2 | 9/2011 | Rosen |
| 8,262,468 B1 | 9/2012 | Vanbragt et al. |
| 8,303,416 B1 | 11/2012 | Thakkar et al. |
| 8,342,967 B2 | 1/2013 | Thakkar et al. |
| 8,348,765 B1 | 1/2013 | Thakkar et al. |
| 8,771,079 B1 | 7/2014 | Sethi et al. |
| 8,843,491 B1 | 9/2014 | Mazniker et al. |
| 9,289,686 B2 | 3/2016 | Hall et al. |
| 9,457,278 B2 | 10/2016 | Sethi et al. |
| 9,700,803 B2 | 7/2017 | Hall et al. |
| 2002/0142815 A1 | 10/2002 | Candelore |
| 2002/0183105 A1 | 12/2002 | Cannon et al. |
| 2003/0050115 A1 | 3/2003 | Leon et al. |
| 2003/0195043 A1 | 10/2003 | Shinners et al. |
| 2004/0097287 A1 | 5/2004 | Postrel |
| 2004/0127289 A1 | 7/2004 | Davis et al. |
| 2004/0132521 A1 | 7/2004 | Peterson |
| 2005/0070359 A1 | 3/2005 | Rodriquez et al. |
| 2006/0116198 A1 | 6/2006 | Leen et al. |
| 2006/0121990 A1 | 6/2006 | O'Kelley, II et al. |
| 2006/0121991 A1 | 6/2006 | Borinik et al. |
| 2006/0135264 A1 | 6/2006 | Shaw et al. |
| 2006/0247055 A1 | 11/2006 | O'Kelley, II et al. |
| 2006/0270419 A1 | 11/2006 | Crowley et al. |
| 2006/0287096 A1 | 12/2006 | O'kelley, II et al. |
| 2006/0287099 A1 | 12/2006 | Shaw et al. |
| 2007/0060305 A1 | 3/2007 | Amaitis et al. |
| 2007/0087799 A1 | 4/2007 | Van Luchene |
| 2007/0117629 A1 | 5/2007 | Fowler et al. |
| 2007/0173323 A1 | 7/2007 | Johnson et al. |
| 2007/0173326 A1 | 7/2007 | Jennings et al. |
| 2008/0004117 A1 | 1/2008 | Stamper et al. |
| 2008/0146338 A1 | 6/2008 | Bernard et al. |
| 2008/0256015 A1 | 10/2008 | Woolf et al. |
| 2009/0005172 A1 | 1/2009 | Shibahara et al. |
| 2009/0030932 A1 | 1/2009 | Harik et al. |
| 2009/0075738 A1* | 3/2009 | Pearce .................... G07F 17/32 463/42 |
| 2009/0149248 A1 | 6/2009 | Busey et al. |
| 2009/0197681 A1 | 8/2009 | Krishnamoorthy et al. |
| 2009/0239668 A1 | 9/2009 | Han |
| 2009/0264202 A1 | 10/2009 | Chen et al. |
| 2009/0265242 A1 | 10/2009 | Horvitz et al. |
| 2009/0280909 A1 | 11/2009 | McEniry |
| 2009/0281988 A1* | 11/2009 | Yoo ........................ G06Q 30/02 |
| 2009/0312096 A1 | 12/2009 | Kane et al. |
| 2009/0319304 A1 | 12/2009 | Smith |
| 2009/0325709 A1 | 12/2009 | Shi |
| 2010/0009756 A1 | 1/2010 | Birclart et al. |
| 2010/0094863 A1 | 4/2010 | Kenton-dau et al. |
| 2010/0160038 A1 | 6/2010 | Youm et al. |
| 2010/0205546 A1 | 8/2010 | Appelman et al. |
| 2010/0218128 A1 | 8/2010 | Bonat et al. |
| 2010/0227669 A1 | 9/2010 | Van Luchene |
| 2010/0306672 A1 | 12/2010 | Mceniry |
| 2011/0246907 A1 | 10/2011 | Wang et al. |
| 2011/0250971 A1 | 10/2011 | van Os et al. |
| 2011/0269546 A1 | 11/2011 | Gill et al. |
| 2011/0275442 A1 | 11/2011 | Hawkins, III |
| 2011/0276631 A1 | 11/2011 | Schmitt |
| 2011/0307551 A1 | 12/2011 | Danezis et al. |
| 2011/0307807 A1 | 12/2011 | Norby |
| 2011/0319175 A1 | 12/2011 | Jensen |
| 2012/0015744 A1 | 1/2012 | Mooney et al. |
| 2012/0041907 A1 | 2/2012 | Wang et al. |
| 2012/0054275 A1 | 3/2012 | Channell |
| 2012/0072382 A1 | 3/2012 | Pearson et al. |
| 2012/0094762 A1 | 4/2012 | Khan |
| 2012/0096002 A1 | 4/2012 | Sheehan et al. |
| 2012/0110678 A1 | 5/2012 | Kumble |
| 2012/0122588 A1 | 5/2012 | Berger et al. |
| 2012/0142429 A1 | 6/2012 | Muller |
| 2012/0202587 A1 | 8/2012 | Allen et al. |
| 2012/0215865 A1 | 8/2012 | Sacks et al. |
| 2012/0225720 A1 | 9/2012 | Baszucki |
| 2012/0225723 A1 | 9/2012 | Webster et al. |
| 2012/0225724 A1 | 9/2012 | Barber et al. |
| 2012/0226749 A1 | 9/2012 | Dale et al. |
| 2012/0252579 A1 | 10/2012 | Sethi et al. |
| 2012/0264520 A1 | 10/2012 | Marsland et al. |
| 2012/0302350 A1 | 11/2012 | Murphy et al. |
| 2012/0302351 A1 | 11/2012 | Murphy et al. |
| 2012/0302354 A1 | 11/2012 | Thakkar et al. |
| 2012/0302355 A1 | 11/2012 | Thakkar et al. |
| 2012/0309538 A1 | 12/2012 | Murphy et al. |
| 2012/0309539 A1 | 12/2012 | Smith et al. |
| 2012/0323686 A1 | 12/2012 | Burger et al. |
| 2013/0007013 A1 | 1/2013 | Geisner et al. |
| 2013/0035164 A1 | 2/2013 | Osvald et al. |
| 2013/0035989 A1 | 2/2013 | Brown et al. |
| 2013/0041916 A1 | 2/2013 | Biesecker et al. |
| 2013/0041949 A1 | 2/2013 | Biesecker et al. |
| 2013/0165234 A1 | 6/2013 | Hall et al. |
| 2013/0172085 A1 | 7/2013 | Harrington |
| 2013/0231179 A1 | 9/2013 | Sproule et al. |
| 2014/0004960 A1 | 1/2014 | Soti et al. |
| 2015/0169571 A1 | 6/2015 | Farago et al. |
| 2016/0048250 A1 | 2/2016 | Thakkar et al. |
| 2016/0199740 A1 | 7/2016 | Hall et al. |
| 2017/0296930 A1 | 10/2017 | Hall et al. |

OTHER PUBLICATIONS

"U.S. Appl. No. 13/077,690, Final Office Action dated Mar. 20, 2013", 19 pgs.

"U.S. Appl. No. 13/077,690, Non Final Office Action dated Aug. 16, 2012", 20 pgs.

"U.S. Appl. No. 13/077,690, Notice of Allowance dated Apr. 23, 2014", 7 pgs.

(56) References Cited

OTHER PUBLICATIONS

"U.S. Appl. No. 13/077,690, Response filed Jun. 19, 2012 to Restriction Requirement dated May 25, 2012", 12 pgs.

"U.S. Appl. No. 13/077,690, Response filed Jul. 22, 2013 to Final Office Action dated Mar. 20, 2013", 16 pgs.

"U.S. Appl. No. 13/077,690, Response filed Nov. 16, 2012 to Non Final Office Action dated Aug. 16, 2012", 14 pgs.

"U.S. Appl. No. 13/077,690, Restriction Requirement dated May 25, 2012", 5 pgs.

"U.S. Appl. No. 13/114,900, Examiner interview Summary dated Feb. 21, 2012", 3 pgs.

"U.S. Appl. No. 13/114,900, Examiner Interview Summary dated Aug. 16, 2012", 3 pgs.

"U.S. Appl. No. 13/114,900, Examiner Interview Summary dated Sep. 17, 2012", 1 pg.

"U.S. Appl. No. 13/114,900, Non Final Office Action dated Jan. 20, 2012", 20 pgs.

"U.S. Appl. No. 13/114,900, Non Final Office Action dated May 11, 2012", 20 pgs.

"U.S. Appl. No. 13/114,900, Notice of Allowance dated Sep. 13, 2012", 12 pgs.

"U.S. Appl. No. 13/114,900, Response filed Apr. 20, 2012 to Non Final Office Action dated Jan. 20, 2012", 17 pgs.

"U.S. Appl. No. 13/244,743, Advisory Action dated Apr. 27, 2016", 4 pgs.

"U.S. Appl. No. 13/244,743, Advisory Action dated May 21, 2015", 4 pgs.

"U.S. Appl. No. 13/244,743, Advisory Action dated Nov. 20, 2013", 2 pgs.

"U.S. Appl. No. 13/244,743, Examiner Interview Summary dated Nov. 9, 2012", 3 pgs.

"U.S. Appl. No. 13/244,743, Final Office Action dated Feb. 5, 2016", 5 pgs.

"U.S. Appl. No. 13/244,743, Final Office Action dated Feb. 9, 2015", 7 pgs.

"U.S. Appl. No. 13/244,743, Final Office Action dated Mar. 13, 2013", 16 pgs.

"U.S. Appl. No. 13/244,743, Final Office Action dated Jun. 19, 2013", 17 pgs.

"U.S. Appl. No. 13/244,743, Non Final Office Action dated Aug. 16, 2012", 15 pgs.

"U.S. Appl. No. 13/244,743, Non Final Office Action dated Aug. 28, 2015", 5 pgs.

"U.S. Appl. No. 13/244,743, Non Final Office Action dated Sep. 23, 2014", 5 pgs.

"U.S. Appl. No. 13/244,743, Notice of Allowance dated Aug. 4, 2016", 8 pgs.

"U.S. Appl. No. 13/244,743, Response filed Jan. 20, 2015 to Non-Final Office Action dated Sep. 23, 2014", 16 pgs.

"U.S. Appl. No. 13/244,743, Response filed Mar. 17, 2015 to Final Office Action dated Feb. 9, 2015", 18 pgs.

"U.S. Appl. No. 13/244,743, Response filed Mar. 24, 2016 to Final Office Action dated Feb. 5, 2016", 17 pgs.

"U.S. Appl. No. 13/244,743, Response filed May 13, 2013 to Final Office Action dated Mar. 13, 2013", 11 pgs.

"U.S. Appl. No. 13/244,743, Response filed Jun. 25, 2012 to Restriction Requirement dated May 24, 2012", 9 pgs.

"U.S. Appl. No. 13/244,743, Response filed Jul. 5, 2016 to Advisory Action dated Apr. 27, 2016", 23 pgs.

"U.S. Appl. No. 13/244,743, Response filed Jul. 9, 2015 to Advisory Action dated May 21, 2015", 20 pgs.

"U.S. Appl. No. 13/244,743, Response filed Oct. 21, 2013 to Final Office Action dated Jun. 19, 2013", 10 pgs.

"U.S. Appl. No. 13/244,743, Response filed Nov. 16, 2012 to Non Final Office Action dated Aug. 16, 2012", 10 pgs.

"U.S. Appl. No. 13/244,743, Response filed Dec. 19, 2013 to Final Office Action dated Jun. 19, 2013", 10 pgs.

"U.S. Appl. No. 13/244,743, Response filed Dec. 28, 2015 to Non Final Office Action dated Aug. 28, 2015", 16 pgs.

"U.S. Appl. No. 13/244,743, Restriction Requirement dated May 24, 2012", 6 pgs.

"U.S. Appl. No. 13/244,921, Examiner Interview Summary dated Feb. 21, 2012", 3 pgs.

"U.S. Appl. No. 13/244,921, Final Office Action dated May 11, 2012", 18 pgs.

"U.S. Appl. No. 13/244,921, Non Final Office Action dated Jan. 24, 2012", 16 pgs.

"U.S. Appl. No. 13/244,921, Notice of Allowance dated Aug. 30, 2012", 11 pgs.

"U.S. Appl. No. 13/244,921, Response filed Apr. 23, 2012 to Non Final Office Action dated Jan. 24, 2012", 13 pgs.

"U.S. Appl. No. 13/244,923, Examiner Interview Summary dated Feb. 21, 2012", 3 pgs.

"U.S. Appl. No. 13/244,923, Final Office Action dated May 8, 2012", 14 pgs.

"U.S. Appl. No. 13/244,923, Non Final Office Action dated Jan. 23, 2012", 17 pgs.

"U.S. Appl. No. 13/244,923, Notice of Allowance dated Sep. 6, 2012", 11 pgs.

"U.S. Appl. No. 13/244,923, Response filed Apr. 23, 2012 to Non Final Office Action dated Jan. 23, 2012", 12 pgs.

"U.S. Appl. No. 13/560,838, Final Office Action dated Jan. 2, 2015", 7 pgs.

"U.S. Appl. No. 13/560,838, Non Final Office Action dated Apr. 25, 2014", 7 pgs.

"U.S. Appl. No. 13/560,838, Non Final Office Action dated May 21, 2015", 8 pgs.

"U.S. Appl. No. 13/560,838, Notice of Allowance dated Nov. 6, 2015", 5 pgs.

"U.S. Appl. No. 13/560,838, Response filed May 4, 2015 to Non Final Office Action dated Jan. 2, 2015", 10 pgs.

"U.S. Appl. No. 13/560,838, Response filed Aug. 21, 2014 to Non-Final Office Action dated Apr. 25, 2014", 12 pgs.

"U.S. Appl. No. 13/560,838, Response filed Sep. 21, 2015 to Non Final Office Action dated May 21, 2015", 26 pgs.

"U.S. Appl. No. 13/599,150, Final Office Action dated Mar. 17, 2016", 9 pgs.

"U.S. Appl. No. 13/599,150, Final Office Action dated Aug. 19, 2014", 26 pgs.

"U.S. Appl. No. 13/599,150, Non Final Office Action dated Jun. 29, 2016", 7 pgs.

"U.S. Appl. No. 13/599,150, Non Final Office Action dated Jul. 21, 2015", 7 pgs.

"U.S. Appl. No. 13/599,150, Non Final Office Action dated Dec. 20, 2013", 25 pgs.

"U.S. Appl. No. 13/599,150, Non Final Office Action dated Dec. 31, 2014", 6 pgs.

"U.S. Appl. No. 13/599,150, Response filed Mar. 23, 2015 to Non-Final Office Action dated Dec. 31, 2014", 15 pgs.

"U.S. Appl. No. 13/599,150, Response filed Apr. 21, 2014 to Non-Final Office Action dated Dec. 20, 2013", 15 pgs.

"U.S. Appl. No. 13/599,150, Response filed May 23, 2016 to Final Office Action dated Mar. 17, 2016", 17 pgs.

"U.S. Appl. No. 13/599,150, Response filed Dec. 9, 2014 to Final Office Action dated Aug. 19, 2014", 12 pgs.

"U.S. Appl. No. 13/599,150, Response filed Dec. 21, 2015 to Non Final Office Action dated Jul. 21, 2015", 14 pgs.

"U.S. Appl. No. 13/735,786, Advisory Action dated Oct. 28, 2015", 4 pgs.

"U.S. Appl. No. 13/735,786, Examiner Interview Summary dated Oct. 7, 2015", 3 pgs.

"U.S. Appl. No. 13/735,786, Final Office Action dated Apr. 28, 2015", 18 pgs.

"U.S. Appl. No. 13/735,786, Non-Final Office Action dated Jan. 16, 2015", 16 pgs.

"U.S. Appl. No. 13/735,786, Response filed Apr. 16, 2015 to Non Final Office Action dated Jan. 16, 2015", 21 pgs.

"U.S. Appl. No. 13/735,786, Response filed Sep. 28, 2015 to Final Office Action dated Apr. 28, 2015", 32 pgs.

"U.S. Appl. No. 13/782,108, Examiner Interview Summary dated Aug. 20, 2019", 4 pgs.

(56) References Cited

OTHER PUBLICATIONS

"U.S. Appl. No. 13/782,108, Final Office Action dated May 27, 2015", 14 pgs.
"U.S. Appl. No. 13/782,108, Final Office Action dated Jun. 28, 2019", 14 pgs.
"U.S. Appl. No. 13/782,108, Final Office Action dated Jul. 28, 2017", 16 pgs.
"U.S. Appl. No. 13/782,108, Non Final Office Action dated Feb. 5, 2016", 14 pgs.
"U.S. Appl. No. 13/782,108, Non Final Office Action dated Oct. 2, 2014", 11 pgs.
"U.S. Appl. No. 13/782,108, Non Final Office Action dated Dec. 13, 2018", 21 pgs.
"U.S. Appl. No. 13/782,108, Non Final Office Action dated Dec. 30, 2016", 17 pgs.
"U.S. Appl. No. 13/782,108, Notice of Allowance dated Sep. 18, 2019", 10 pgs.
"U.S. Appl. No. 13/782,108, Response filed Feb. 2, 2015 to Non-Final Office Action dated Oct. 2, 2014", 11 pgs.
"U.S. Appl. No. 13/782,108, Response filed Mar. 13, 2019 to Non Final Office Action dated Dec. 13, 2018", 15 pgs.
"U.S. Appl. No. 13/782,108, Response filed Jul. 5, 2016 to Non Final Office Action dated Feb. 5, 2016", 13 pgs.
"U.S. Appl. No. 13/782,108, Response filed Nov. 25, 2015 to Final Office Action dated May 27, 2015", 12 pgs.
"U.S. Appl. No. 13/782,108, Response filed Mar. 30, 2017 to Non Final Office Action dated Dec. 30, 2016", 20 pgs.
"U.S. Appl. No. 13/782,108, Response filed Aug. 28, 2019 to Final Office Action dated Jun. 28, 2019", 10 pgs.
"U.S. Appl. No. 13/872,108, Appeal Brief Filed Feb. 26, 2018", 18 pgs.
"U.S. Appl. No. 14/925,519, Final Office Action dated Apr. 22, 2016", 22 pgs.
"U.S. Appl. No. 14/925,519, Non Final Office Action dated Feb. 5, 2016", 16 pgs.
"U.S. Appl. No. 14/925,519, Preliminary Amendment filed Oct. 29, 2015", 10 pgs.
"U.S. Appl. No. 14/925,519, Response filed Apr. 6, 2016 to Non Final Office Action dated Feb. 5, 2016", 31 pgs.
"U.S. Appl. No. 15/075,943, Corrected Notice of Allowance dated Jun. 2, 2017", 2 pgs.
"U.S. Appl. No. 15/075,943, Non Final Office Action dated Jul. 28, 2016", 9 pgs.
"U.S. Appl. No. 15/075,943, Notice of Allowance dated Mar. 6, 2017", 5 pgs.
"U.S. Appl. No. 15/075,943, Preliminary Amendment filed Mar. 31, 2016", 7 pgs.
"U.S. Appl. No. 15/075,943, Response filed Jan. 30, 2017 to Non Final Office Action dated Jul. 28, 2016", 17 pgs.
"U.S. Appl. No. 15/637,341, Non Final Office Action dated Oct. 4, 2018", 11 pgs.
"U.S. Appl. No. 15/637,341, Notice of Allowance dated Jun. 18, 2019", 5 pgs.
"U.S. Appl. No. 15/637,341, Preliminary Amendment filed Jul. 14, 2017", 7 pgs.
"U.S. Appl. No. 15/637,341, Response filed Mar. 4, 2019 to Non Final Office Action dated Oct. 4, 2018", 13 pgs.
"Chess (game) Encyclopedia Britannica", [Online]. Retrieved from the Internet:<http://www.britannica.com/bps/media-view/97/0/1/0>, (Accessed Jan. 16, 2012), 35 pgs.
"Chess Notation", [Online]. Retrieved from the Internet: <http://www.indepthinfo.com>, (Accessed Jan. 16, 2012), 8 pgs.
"Chess Rules", [Online]. Retrieved from the Internet: <http://www.learnchessrules.com>, (Accessed Jan. 16, 2012), 2 pgs.
"Elo rating system", [online] Wikipedia, [retrieved on Jun. 30, 2016]. https://en.wikipedia.org/wiki/Elo_rating_system#Most_accurate_K-factor, 18 pgs.
"FIDE Laws of Chess", [Online]. Retrieved from the Internet: <http://fide.com/FIDE/handbook/LawsofChess.pdf>, (Accessed Jan. 16, 2012), 2 pgs.
"Guild vs. Guild", [Online] Retrieved From Internet: <http://wiki.guildwars.com/wiki/Guild_versus_Guild>, (Accessed May 21, 2013), 5 pgs.
"Inside Xbox—Facebookon Xbox Live", [Online]. Retrieved from the Internet: <https://www.youtube.com/watch?v=YdGMoe4Gzxw>, (Nov. 17, 2009).
"Instance Limitations", [Online] Retrieved From Internet: <http://www.wowwiki.com/Instance_limitations>, (Accessed May 21, 2013), 1 pg.
"International Application Serial No. PCT/US2012/048691, International Preliminary Report on Patentability dated Feb. 6, 2014", 6 pgs.
"International Application Serial No. PCT/US2012/048691, Search Report dated Oct. 16, 2012", 2 pgs.
"International Application Serial No. PCT/US2012/048691, Written Opinion dated Oct. 16, 2012", 4 pgs.
"Pairing Theory and tsh", [online] Sep. 7, 2010 [retrieved on May 23, 2011]. Retrieved from the Internet: <URL: http://www.poslarchive.com/math/software/tsh/doc/pairing.html>, 9 pgs.
"Raiding for Newbies", [Online] Retrieved From Internet: <http://www.wowwiki.com/Raiding_for_newbies>, (Accessed May 21, 2013), 4 pgs.
"Rules of Chess—Frequently Asked Questions", [Online], Retrieved from the Internet: <http://www.chessvariants.com>, (Accessed Jan. 16, 2012), 46 pgs.
"Swiss-system tournament", [online] Wikipedia, May 13, 2011 [retrieved on May 23, 2011]. Retrieved from the Internet: <URL: http://en.wikipedia.org/wiki/Swiss-system_tournament>, 9 pgs.
"Xbox Avatar Awards as Alluring as Achievements", [Online] Retrieved From Internet: <http://www.wired.eom/gamelife/2009/11/avatar-awards/>, (Oct. 23, 2009).
"Xbox Connects with Facebook", [Online] Retrieved From Internet: <http://www.facebook.com/notes/180558067130>, (Nov. 17, 2009).
Badgeunlock, "Foursquare Badge—Entourage", [Online] Retrieved from the internet http://www.badgeunlock.com/201 0/08/foursquare-badge-entourage-retiredsxsw-2009/, (Aug. 9, 2010), 2 pgs.
Schiller, Eric, "The Official Rules of Chess", Caordoza Publishing, [Online]. Retrieved from the Internet: <http://www.ericschiller.com/pdf/PfficalRulesofChessSampe.pdf>, (Accessed Jan. 16, 2012), 2 pgs.

* cited by examiner

METHOD AND SYSTEM FOR MATCHMAKING CONNECTIONS WITHIN A GAMING SOCIAL NETWORK

CLAIM OF PRIORITY

This patent application is a continuation of U.S. patent application Ser. No. 15/637,341, filed on Jun. 29, 2017, which is a continuation of U.S. patent application Ser. No. 15/075,943, filed on Mar. 21, 2016, which is a continuation of U.S. patent application Ser. No. 13/560,838, filed on Jul. 27, 2012, which claims the benefit of priority to U.S. Provisional Patent Application Ser. No. 61/512,772, filed on Jul. 28, 2011, and to U.S. Provisional Patent Application Ser. No. 61/605,606, filed on Mar. 1, 2012, each of which is hereby incorporated by reference herein in its entirety.

TECHNICAL FIELD

The present disclosure generally relates to games and applications in general and, in particular embodiments, to computer-implemented social networks operating in connection with the games and applications.

BRIEF DESCRIPTION OF THE DRAWINGS

Some embodiments are illustrated by way of example and not limitation in the figures of the accompanying drawings.

DESCRIPTION OF EXAMPLE EMBODIMENTS

Figure 1A:
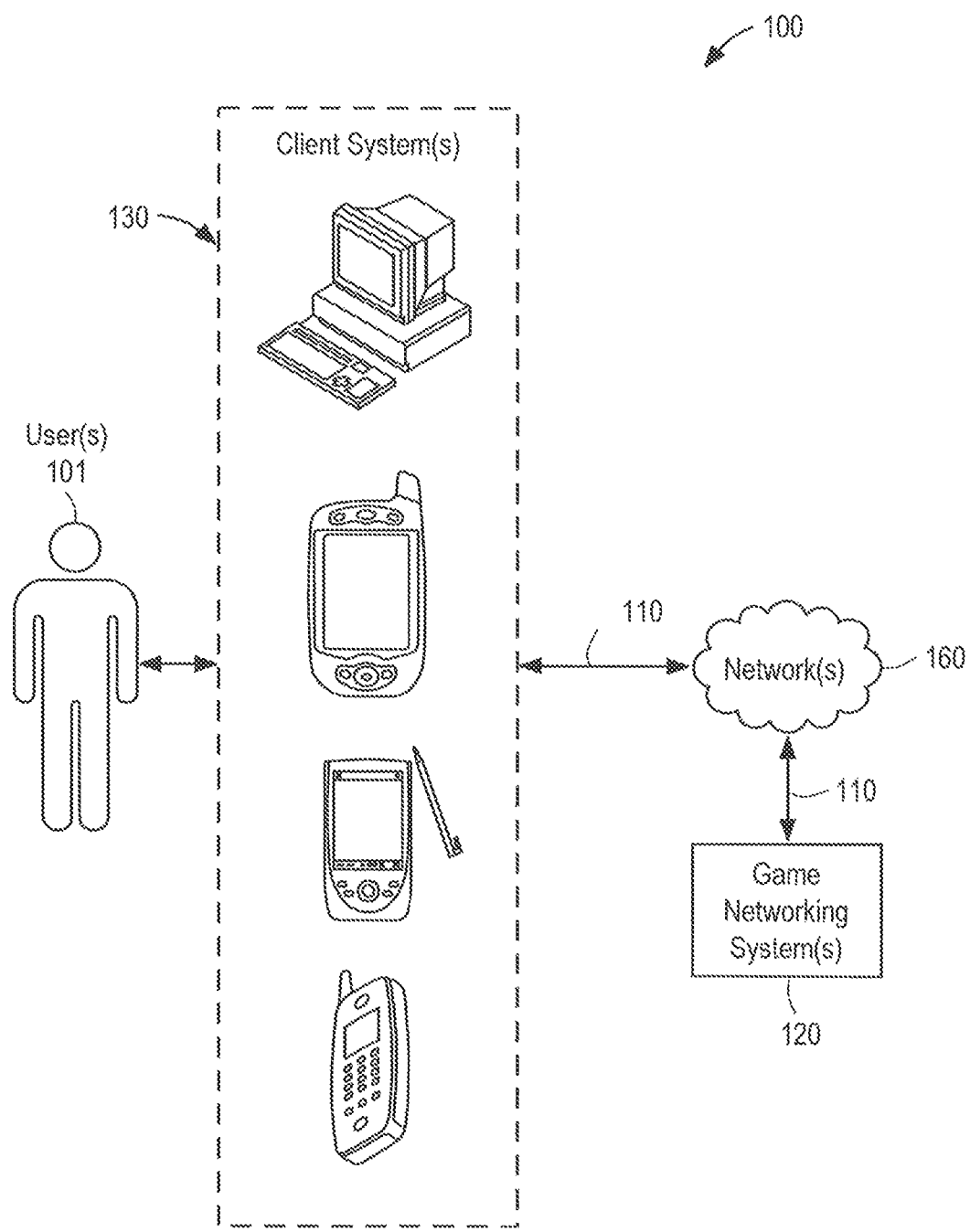
FIG. 1a illustrates a system configured for implementing various disclosed example embodiments.

In the following description, for purposes of explanation, numerous specific details are set forth in order to provide an understanding of various embodiments of the present subject matter. It will be evident, however, to those skilled in the art that various embodiments may be practiced without these specific details.

Various techniques are described herein for providing game functionality and features related to recommending, establishing, and maintaining connections between various members ("users") of a gaming social network. A gaming social network, further described in the following disclosure, includes a social network of connected users, who are connected as a result of common activities, interests, interactions, or otherwise in one or more games or a gaming environment.

Many network-connected games are designed for interaction between multiple players, and offer various levels of engagement between cooperative or competitive users and other users with common interests in gaming. Various networked gaming systems offer the ability to connect users (e.g., to "friend" users) to conduct shared game experiences and gaming sessions, but fail to assist a user with establishing a robust social network that can engage in game play on a regular basis. A lack of social connection within network-connected games or portability between social networks for network-connected games may result in users reducing the amount of game play, obtaining less enjoyment with game play, or even neglecting or leaving the gaming social network.

An example embodiment described herein provides a more efficient platform for game play and access to social networks associated with game play. For example, a social gamming network can automatically associate with a game-player "neighbors" or candidate individuals for in-game gameplay, chat, or other interaction from multiple out-of-game social networks. A game-player's in-game neighbors can be based on the game-player's one or more out-of-game social networks and the game-player's in-game interactions with other game-players who may or may not be in one of those out-of-game social networks. In an example, a game-player's in-game neighbors can be automatically assigned by selecting individuals from the game-player's one or more out-of-game social networks that have previously or are currently playing the game the game-player is participating in.

An example embodiment, auto-neighboring can be based on how a player is authenticated into the gaming system. Social graphs from multiple social networks (e.g., Yahoo!®, Facebook®, Google+®, e-mail contacts, in-game friends, etc.) can be provided to the gamming system, thereby increasing the size of the player's potential in-game neighbors. In the gaming system the player can access a larger number of friends than would be available from a single network, and offer or suggest game-play, gift in-game resources, or perform other game-related interactions independently of how the player and each of the player's neighbors accessed the gaming system.

For example, by being informed of an existing Facebook connection or relationship, the gaming system can provide an automatic game-player relationship between the connections because gaming system knows both players have an out-of-game (i.e., Facebook) connection. In one embodiment an in-game social connection can be formed based on the imported out-of-game relationship and data indicating that one or more members of the player's social network have previously participated or established an account with the gaming system. Additionally, if multiple game-players have previously accessed the gaming system the system can maintain a database of which one or more games each of the individuals play and suggest coordinated or competitive game play of mutual games that have been previously played by the contacts when both are connected to the gamming system. A player's in-game enjoyment of a game can be increased by accurately and automatically suggesting friends or neighbors to the player by suggesting or automatically linking the player's profile to game players who have a mutual interest in the game the player is playing.

An example embodiment described herein provides dynamic matchmaking techniques to select and recommend appropriate social network connections, and assist users to establish and populate connections within the gaming social network. Producing a recommendation of a new gaming social network connection may be based on a variety of characteristics, including gaming engagement, gaming experience, compatibility to a matched user, gaming social network activity, non-gaming social network activity, and like factors.

In an example embodiment, matching potential connections is based on various profile characteristics obtained from a user profile in the gaming social network. User profile characteristics relevant to matching a selected user to a potential connection may include analyzing data or information stored for: gaming social network connections, game actions, social actions, reputation data, location information, or temporal information of the user and the potential connection. Connection recommendations may be produced in an attempt to connect the selected user with more distant or unknown connections of his or her social network that may otherwise be overlooked or unknown.

To encourage the adoption of user connection recommendations and the expansion of a selected user's gaming social network, a variety of user interface enhancements and process flows may be provided. These user interface enhancements may, for example, include providing information to the selected user that is relevant to the recommended connection's activity and skill within selected games. Additionally or instead, the user interface enhancements provided to assist the selected user with finding connections may include a display of calculated metrics for recommended connections, such as a "helpfulness" rating, determining whether mutual connections exist with any of the selected user's existing connections in a gaming or an out-of-game social network, and the like. Displaying relevant gaming information to accompany the connection recommendations of the gaming social network may also assist the selected user to understand the basis for the recommended connection and encourage adoption of the recommendations.

Although the aspects of the present invention are described below with reference to specific example embodiments, it will be evident that various modifications and changes may be made to these embodiments without departing from the broader spirit and scope of the invention. Accordingly, the specification and drawings are to be regarded in an illustrative rather than a restrictive sense. In particular, although the present disclosure is focused on various example embodiments of a gaming social network maintained separate from an out-of-game or third party social network service, it will be recognized that the techniques described herein may also be integrated within numerous variations of a single social network service or offering. Similarly, the gaming social network service may comprise a combination of multiple in-game social networks or social groups designated for game play in connection with one or many games or applications.

Example System

FIG. 1a is a block diagram illustrating an example of a system 100 for implementing various disclosed embodiments. In particular embodiments, system 100 comprises user(s) 101, game networking system 120, client system 130, and network 160. The one or more users(s) 101 may also be referred to as one or more player(s); and the player(s) may also be referred to as the user(s) 101. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Game networking system 120 is a network-addressable computing system that can host one or more online games. Game networking system 120 can generate, store, receive, and transmit game-related data, such as, for example, game account data, game input, game state data, and game displays. Game networking system 120 can be accessed by the other components of system 100 either directly or via network 160. Player 101 may use client system 130 to access, send data to, and receive data from game networking system 120. Client system 130 can access game networking system 120 directly, via network 160, or via a third-party system. Client system 130 can be any suitable computing device, such as a personal computer, laptop, cellular phone, smart phone, computing tablet, and the like.

Although FIG. 1a illustrates a particular number of players 101, game networking systems 120, client systems 130, and networks 160, this disclosure contemplates any suitable number of players 101, game networking systems 120, client systems 130, and networks 160. Although FIG. 1a illustrates a particular arrangement of player 101, game networking system 120, client system 130, and network 160, this disclosure contemplates any suitable arrangement of player 101, game networking system 120, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include one or more of an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1*a* illustrates particular connections between player 101, game networking system 120, client system 130, and network 160, this disclosure contemplates any suitable connections between player 101, game networking system 120, client system 130, and network 160. As an example and not by way of limitation, in particular embodiments, client system 130 may have a direct connection to game networking system 120, thereby bypassing network 160.

Figure 1B:
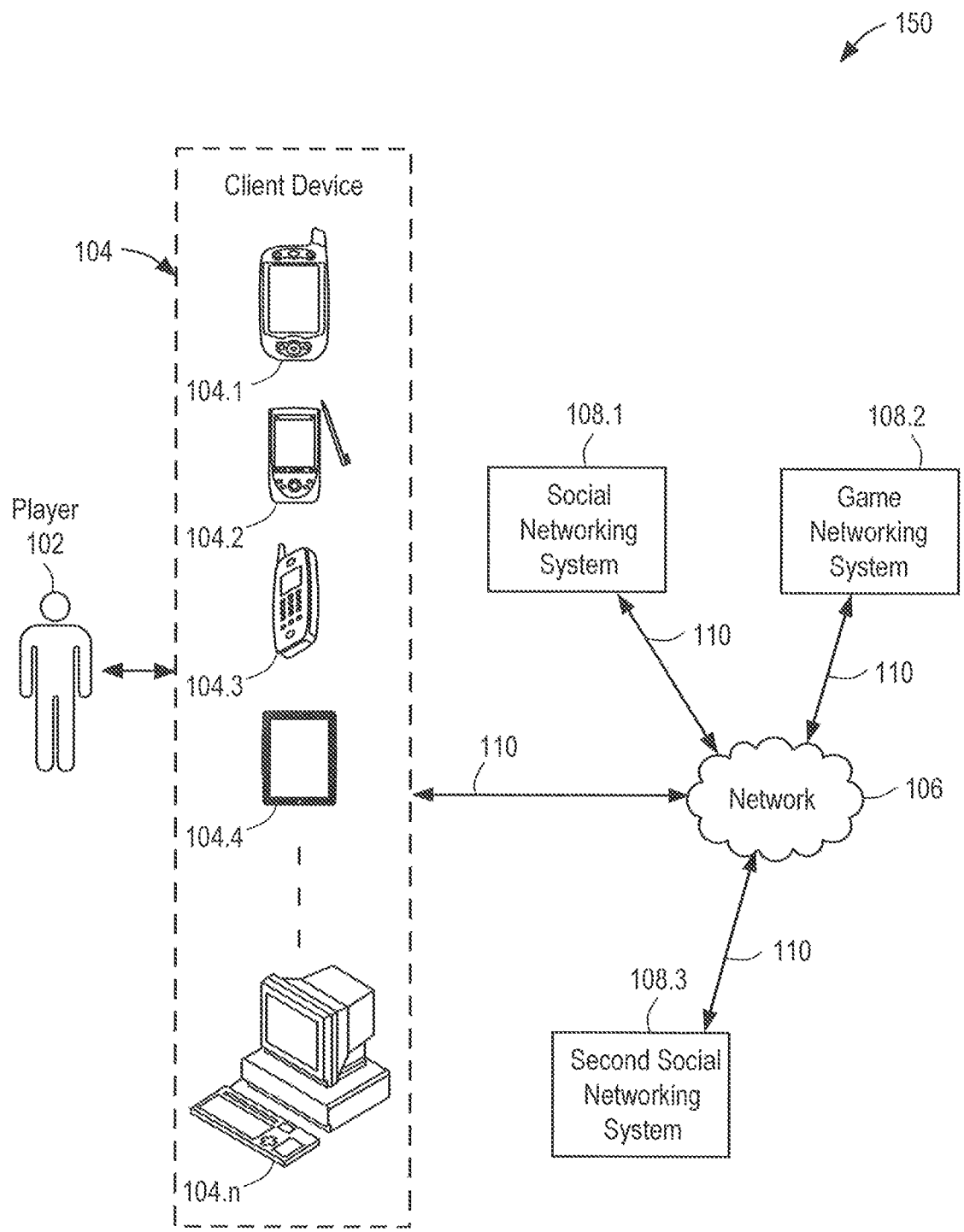
FIG. 1b illustrates a system configured for implementing various disclosed example embodiments.

FIG. 1*b* illustrates an example of a system for implementing various disclosed embodiments. In particular embodiments, the system 150 comprises player 102, a social networking system 108.1, and a game networking system 108.2, client device 104, and a network 106. The components of system 150 can be connected to each other in any suitable configuration, using any suitable type of connection such as connections 110. The components may be connected directly or over a network 106, which may be any suitable network.

The client device 104 may be any suitable computing device (e.g., devices 104.1-104.*n*), such as a smart phone 104.1, a personal digital assistant (PDA) 104.2, a mobile phone 104.3, a computing tablet 104.4, a personal computer 104.*n*, a laptop, and the like. The client device 104 may access the social networking system 108.1 or the game networking system 108.2 directly, via the network 106, or via a third-party system. For example, the client device 104 may access the game networking system 108.2 via the social networking system 108.1. The player 102 can use the client device 104 to play the virtual game, and access relevant information of the player and the player's connections in the gaming social network.

Social networking system 108.1 may include a network-addressable computing system that can host one or more social graphs (see, for example, FIG. 2) and may be accessed by the other components of system 150 either directly or via the network 106. The social networking system 108.1 may generate, store, receive, and transmit social networking data. Moreover, the game networking system 108.2 may include a network-addressable computing system (or systems) that can host one or more virtual games, for example, online. The game networking system 108.2 may generate, store, receive, and transmit game-related data, such as, for example, game account data, game input, game state data, and game displays. The game networking system 108.2 may be accessed by the other components of system 150 either directly or via the network 106. The player 102 may use the client device 104 to access, send data to, and receive data from the social networking system 108.1, the game networking system 108.2, or a combination of multiple networking systems.

Although FIG. 1*b* illustrates a particular number of players 102, social networking systems 108.1 and 108.3, game networking systems 108.2, client devices 104, and networks 106, this disclosure contemplates any suitable number of players 102, social networking systems 108.1 and 108.3, and game networking systems 108.2, client devices 104, and networks 106. As an example and not by way of limitation, system 150 may include one or more game networking systems 108.2 and no out-of-game social networking system. As another example and not by way of limitation, system 150 may include a system that comprises both social networking system 108.1, and game networking system 108.2. Moreover, although FIG. 1*b* illustrates a particular arrangement of player 101, social network system 108.1, game networking system 108.2, client device 104, and network 106, this disclosure contemplates any operable arrangement of player 101, social network system 120*a*, game networking system 108.2, client device 104, and network 106.

Figure 2:
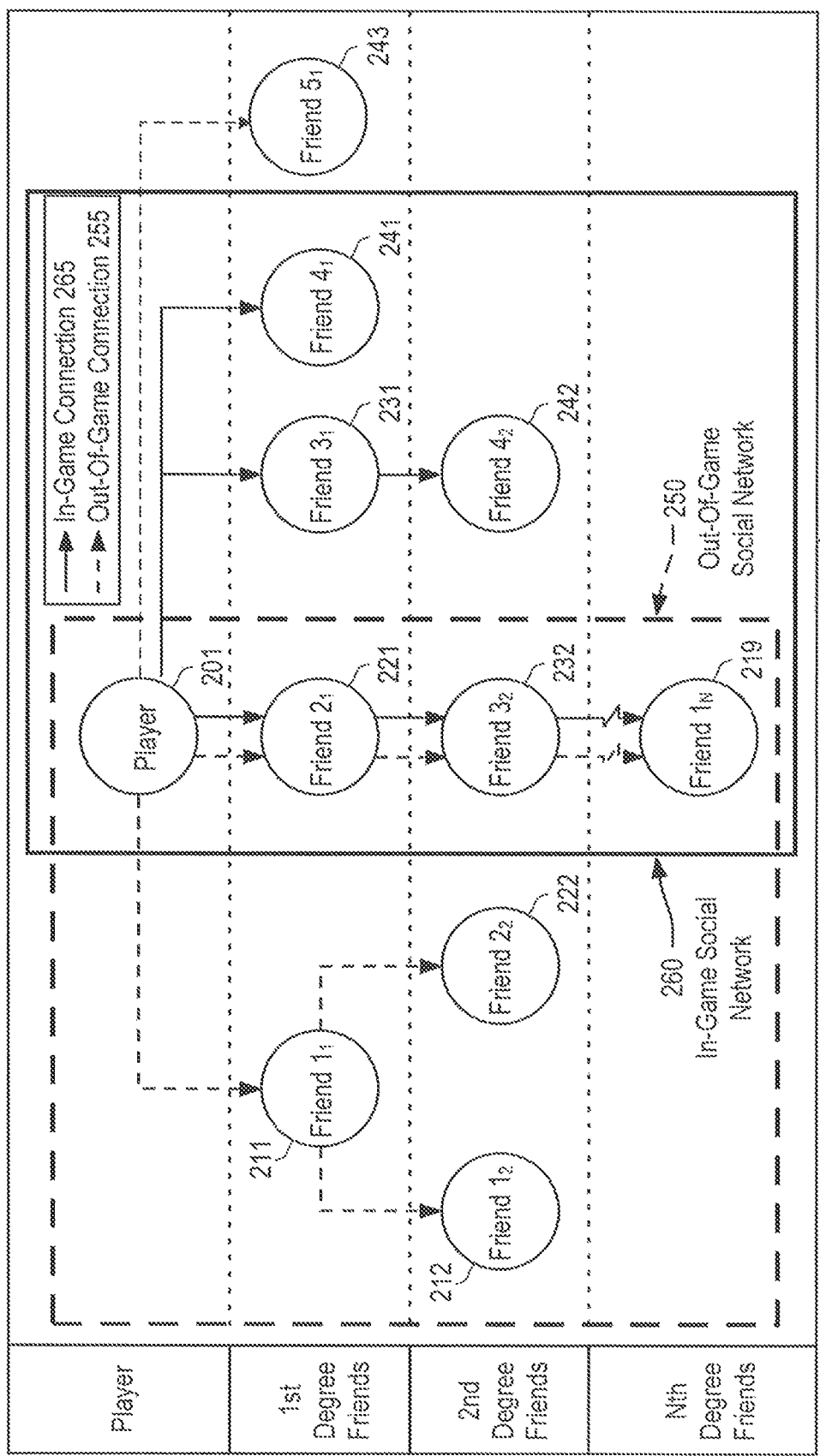
FIG. 2 illustrates an example of an in-game social network and an out-of-game social network within a social graph.

FIG. 2 shows an example of a social network within a social graph 200. Social graphs are models of connections between entities (e.g., individuals, users, contacts, friends, players, player characters, non-player characters, businesses, groups, associations, concepts, etc.). These entities are considered "users" of the social graph, as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. A social graph may include entities of different types, a combination of entity types, or multiple entities of a single type.

Social graph 200 is shown by way of example to include an out-of-game social network 250 and an in-game social network 260. Portions or the entire social graph within the social networking system 108.1 or 108.3 may be managed by a third party. In example embodiments, the social networking system 108.1 maintains the out-of-game social network 250, while the game networking system 108.2 maintains the in-game social network 260. In-game social network 260 may include one or more players who are friends with player 201 (e.g., friend 231), and may include one or more other players who are not friends with player 201. The social graph 200 may correspond to the various players associated with one or more virtual games. In an example embodiment, each player may "build" their own virtual structures in their own virtual environment to enhance this virtual environment (e.g., to increase the population of a virtual city). When, for example, player 201 visits the virtual environment of friend 231, player 201 may interact with the virtual structures built by friend 231 to earn coins, and to assist player 201 in maintaining his virtual environment.

Therefore, the player 102 may have a social network maintained by both the game networking system 108.2 and the social networking system 108.1 or 108.3, wherein the player 102 can have a social network on the game networking system 108.2 that is a subset, superset, or independent of the player's social network on the social networking system 108.1 or 108.3. Additionally, a system can include individuals who are not part of either the social networking systems 108.1 or 108.3, and the in-game social network 260, but are known to player 201 (e.g., friend 243). In such systems, game networking system 108.2 can maintain social graph information with edge-type attributes that indicate whether a given friend is an "in-game friend," an "out-of-game friend," or both. An out-of-game friend can be either a member of a social networking system or identified by other contact information (e.g., an e-mail address).

Further, the game networking system 108.2 may be configured to maintain separate social networks for each or multiple of the number of games offered in the game networking system. For example, a player may select one set of neighbors for game-play in a first game from one or more social or gaming networks, and in a second game the player may select a second set of neighbors for game-play from the same or different social networks. The first and second sets of neighbors may include one or more identical users based on the player's preferences or game-play analysis performed by the gaming system.

For purposes of simplicity, the present disclosure refers to the in-game social network that may exist for one or more games as the gaming social network, which may be maintained separately from the out-of-game social network. It will be understood, however, that a single provider or business entity may provide both the gaming social network and the out-of-game social network, or provide an interface to the gaming social network directly within an interface to the out-of-game social network. Thus, the game networking system (e.g., providing the gaming social network) and the social networking system (e.g., providing the out-of-game social network) may be operated by the same provider or separate providers.

As FIG. 2 illustrates, some of the social network members and connections may be identical or overlapping between a gaming social network and an out-of-game social network. Separate profiles and user accounts may exist for these overlapping users in each network; and as explained herein, enhanced functionality may be achieved through linking the accounts from the in-game and out-of-game social networks. A clear distinction between the social networks may not be directly evident to users, especially when aspects of the gaming social network are directly delivered through an interface associated with the out-of-game social network. The following examples draw a distinction between operations occurring in the gaming social network and the out-of-game social network, even though features of both social networks may be provided simultaneously within a single graphical user interface.

One or more social networks can be virtually merged by assigning a unique identifier to each individual in each social network and attempting to match individuals from multiple social networks to a common user-identifier in a gaming network based on unique attributes (e.g., a common e-mail address associated or registered with two or more social networks or the gaming network).

Gaming Social Network User Profile Data

Figure 3:
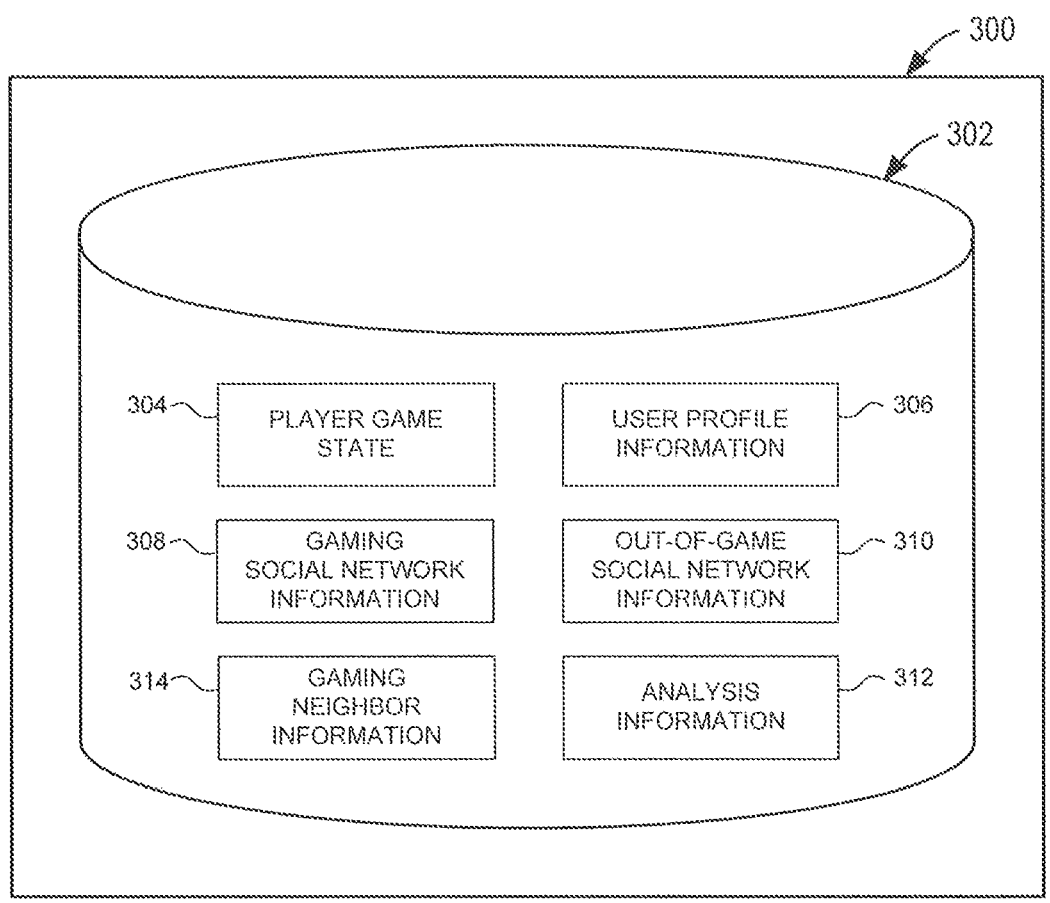
FIG. 3 illustrates an example database system configured to store information related to a gaming social network according to one example embodiment.

FIG. 3 illustrates an example database system 300 configured to store information in connection with the gaming social network. In some example embodiments, the database system 300 may correspond to a database maintained within the game networking system 108.2 and, accordingly, is described by way of example with reference thereto. In other example embodiments, the database system 300 may correspond to a separate computer system or information service that may be accessed by the game networking system 108.2 via a computer network (e.g., network 106 of FIG. 1b).

The database system 300 may include a database storage 302 that stores information associated with users of the game networking system and the gaming social network. The database system 300 may receive various queries from users and processes of the game networking system related to user profile data, and the database system 300 may process the queries using the database storage 302. In some example embodiments, the database storage 302 may store the following information: a player game state 304, a user profile information 306, gaming social network information 308, out-of-game social network information 310, analysis information 312, and gaming neighbor information 314.

Player game state 304 may include information about the player's virtual environment, the player's character, or other game-related information, for one or a plurality of games. For example, player game state 304 may include virtual objects owned or used by the player, placement positions for virtual structural objects in the player's virtual environment, and the like. Player game state 304 may also include in-game obstacles for the player (e.g., new obstacles, current obstacles, completed obstacles, etc.), the player's character attributes (e.g., character health, character energy, amount of coins, amount of cash or virtual currency, etc.), and the like.

In some example embodiments, the user profile information 306 may include user-provided information that is gathered from the player, his or her client device, the gaming social network, the out-of-game social network, or an affiliate social network. The user-provided information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

Gaming social network information 308 may include information from the gaming social network, including: the player's set of Nth degree friends; user-generated content that has been generated by the player; user-generated content that has been directed to the player; user-generated content that mentions or makes reference to the player; social actions occurring between the user and others in the gaming social network; user preferences and privacy settings in the gaming social network; and the like.

The out-of-game social network information 310 may include information from an affiliate social network of which the player is a member, including: the player's profile information from the affiliate social network; the player's set of Nth degree friends in the affiliated social network; user-generated content that has been generated by the player using the affiliated social network; user-generated content, from a member of the affiliated social network, that has been directed to the player, user-generated content, from a member of the affiliated social network, that mentions or makes reference to the player; and the like.

The analysis information 312 may include information that the game networking system 108.2 may use to interpret the user-generated content, gaming activities, and activities in the gaming social network. For example, this information may include a semantic indicator to correspond to a word or phrase used in the user-generated content, and may include a weighted value that indicates a likelihood for a certain meaning and/or tone (e.g., a likelihood that the player's use of the word "bad" in the user-generated content may be interpreted as "good"). In some example embodiments, the game networking system 108.2 may use the weighted semantic indicators to satisfy a trigger description of a trigger event. For example, the game networking system 108.2 may use the semantic indicators to analyze user-generated content, and based on the semantic indicators that match the user-generated content with a high likelihood, the game networking system 108.2 may determine one or more possible trigger events that indicate in-game events that the player is likely to perform (and determine likelihood values related thereto).

Gaming neighbor information 314 may include information indicating which players from the player's gaming social network information 308 or out-of-game social network information 310 are currently available to play a game, currently playing a game, or otherwise able to interact with the player. This information may originate from either or both of the gaming social network information 308 and out-of-game social network information 310, or another source provided by the player. Gaming neighbor information 314 may be automatically generated or updated as other players enter or leave the game networking system 108.2.

Figure 4:
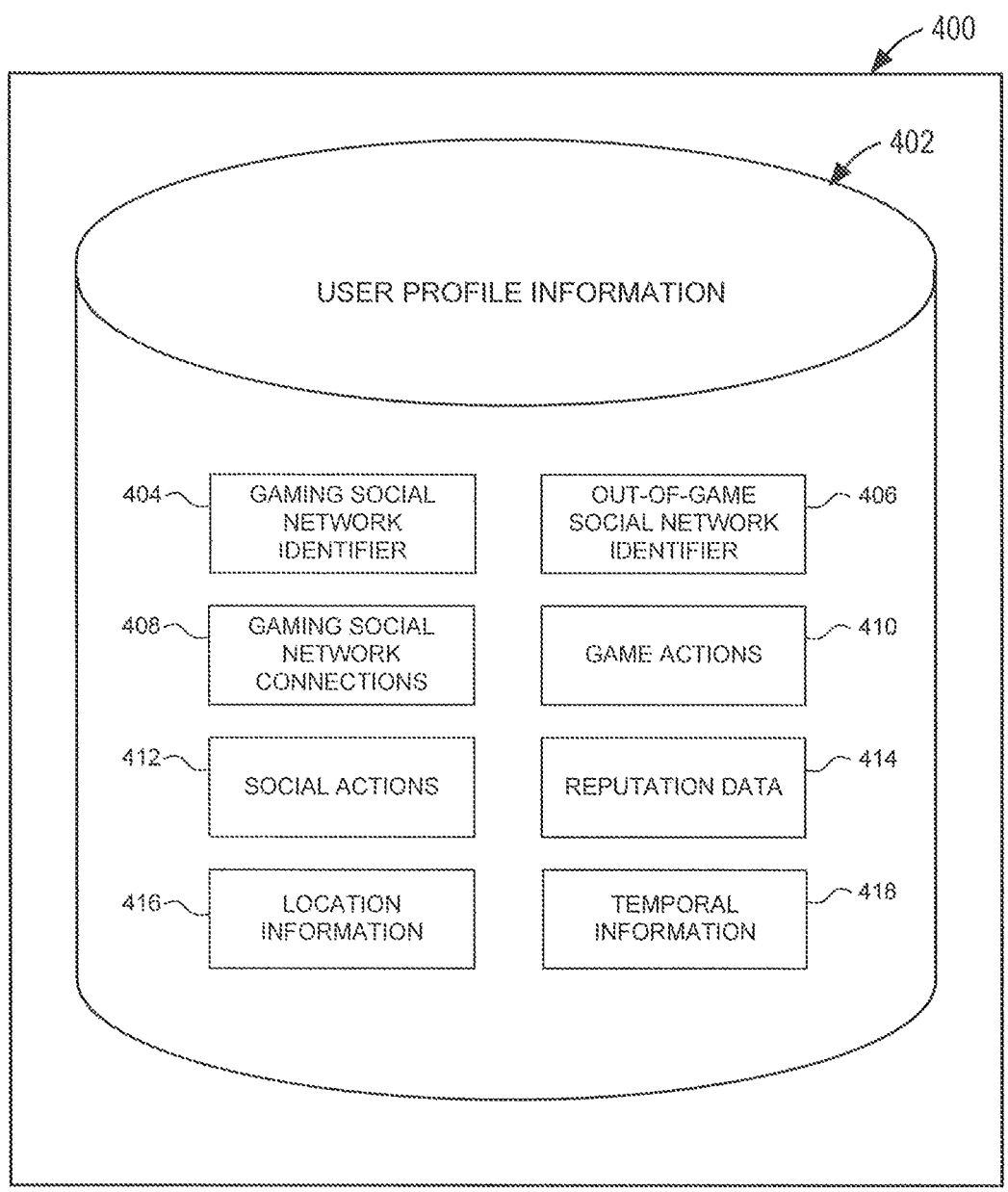
FIG. 4 illustrates an example database system configured to store information related to user profile information for a gaming social network according to one example embodiment.

FIG. 4 illustrates an example database system 400 with database 402 configured to store user profile information 306 related to the game social network. In some example embodiments, the database system 400 may correspond to a database or data store maintained within database system 300, within the game networking system 108.2, or by a separate computer system or information service that may be accessed by the game networking system 108.2.

A specific example of the types of user profile information data that may be maintained within database system 400, include a gaming social network identifier 404; an out-of-game social network identifier 406; gaming social network connections 408; game actions 410; social actions 412; reputation data 414; location information 416; and temporal information 418.

Specifically, in an example embodiment, data for a gaming social network identifier 404 may be maintained and include one or more nicknames, aliases, or other identifiers (including identifiers that may be unique to a specific game) associated with the user profile. Also in an example embodiment, prior to the user claiming a profile, the social network identifier may be a generic unique user identifier. The data for an out-of-game social network identifier 406 may be maintained in the database 402 and include identifiers, handles, or aliases for one or more social networking services external to the gaming social network (for example, a Facebook account identifier).

Data for game actions 410 relevant to the gaming social network may be maintained in database 402, and may include data related to cooperative or adverse game play actions, and other game-related contact occurring between the user and the user's connections in the gaming social network. Data for social actions 412 may include various social interactions occurring within the social network, for example, messages or gaming initiations sent between connections.

Reputation data 414 may be produced from raw or aggregate data related to the user's helpfulness, participation, cooperation, user gaming ratings, or other measures, and may include a score or other measurement of the user's helpfulness to others. For example, the game networking system 108.2 may determine reputation-related information for the player based on user-generated content from the player or his Nth degree friends (e.g., in-game messages or social network messages), and on the amount of helpful activities (e.g., sending gifts or assisting neighbors in cooperative games) conducted with others.

Data for location information 416 may include user-provided and derived information about the user's known geographical location. Data for temporal information 418 may track the user's times, type, and amount of activity on the game networking system and gaming social network, enabling detailed statistics to be produced regarding various user actions within the game networking system and the gaming social network.

The user profile information for the gaming social network provided by database system 400 may be accessed by any of a number of applications and services operating internal or external to the gaming social network, or the game networking system. For example, the user profile information may be mined for use in connection with user- or connection-targeted promotions and communications by the game networking system. As further described in the following disclosure, the user profile information may be exposed through a variety of GUIs within the gaming social network, the out-of-game social network, the game networking system, and related services.

Figure 5:
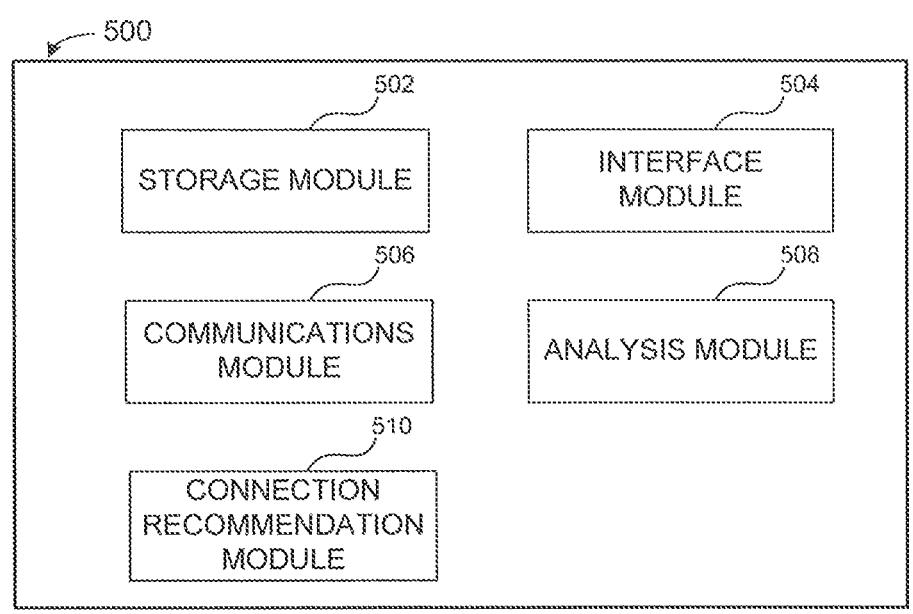
FIG. 5 illustrates an example apparatus providing a set of modules to implement connection recommendations based on user profiles in a gaming social network according to an example embodiment.

FIG. 5 illustrates an example apparatus 500, for implementing techniques and methods in accordance with various example embodiments within a gaming social network to provide a user profile and connection recommendations based on the user profile. The apparatus 500 may include a storage module 502, an interface module 504, a communication module 506, an analysis module 508, and a connection recommendation module 510.

In some example embodiments, the storage module 502 may correspond to the database storage 302 and 402 of FIGS. 3 and 4, respectively. The storage module 502 may store, for example, information related to the player's virtual gaming environments, the player's game state and gaming activities, the player's user profile information, social networking relationship data for the user and the gaming social network, and derived information relevant to connections and activities in the gaming social network.

The interface module 504 may generate a graphical user interface (GUI) and/or a text-based user interface to interact with the player in connection with the gaming social network. For example, the interface module 504 may generate a user interface for presenting a user profile "page" or summary view of user profile information in accordance with the capabilities of a user profile in the gaming social network.

The communication module 506 may receive and process various communications occurring within the gaming social network and the games associated with the gaming social network, and may use the storage module 502 to store or persist relevant data relevant to the user profile information. Further, the communication module 506 may facilitate the sending of relevant alerts, messages, and prompts to client device 104 as part of gaming social network activities, for example, to forward an alert through the out-of-game social network to the player's client device 104 when certain activities occur within the gaming social network. The communication module 506 may also facilitate communications from the user to the user's connections and other users of the gaming social network.

The analysis module 508 may extract various data elements from the user profile of the gaming social network relevant to gaming and social network activities. For example, the amounts, type, and content of interactions occurring between two users within a game may be analyzed to determine suggested actions or content between the users within the gaming social network. The analysis module 508 may also be used to perform statistical analysis and extract information from user profile information in the gaming social network for purposes such as targeted advertising, promotions, user preferences, and the like.

The connection recommendation module 510 may operate to provide connection recommendations to a user, encouraging a user to add a specific connection to his or her gaming social network or out-of-game social network. Further, the connection recommendation module 510 may also operate to provide suggestions of interactions within the gaming social network, including but not limited to suggestions involving individual user connections, groups or teams, multiple player game and out-of-game activities, shared communications, and the like. The connection recommendation module 510 may use data analyzed by the analysis module 508 when obtaining relevant connection data from the user profile information of gaming social network users. It should be noted that, in example embodiments, one or more of the modules may reside different devices or apparatus. The modules are merely shown by way of example to reside on a single apparatus 500 to facilitate explanation thereof.

The user profile data, and in some embodiments the database systems and modules described herein, are operable in conjunction with the gaming social network and game networking system to provide a unified set of data or user profile.

The singular references to a user profile are intended to refer to a set of data or information associated with a specific user of the gaming social network, and not necessarily a specific webpage, interface, view, exposition, or use of data. A variety of interfaces or applications, therefore, may be designed to consume and interface with the gaming social network user profile and associated user profile information. For purposes of clarity, a user interface that exposes the user profile information of the gaming social network to internal and external users is referred to as a "user profile GUI," whereas the set of data generally associated with the member of the gaming social network is referred to as "user profile information."

User Profile "Matchmaking" Techniques

As an example of the matchmaking and user connection recommendation techniques described herein, consider a user who is invited to play a game hosted by a game networking system through a series of invitations from various social contacts and connections, such as "friends" from an out-of-game social network. As the user engages in game play and proceeds with game achievements, the user discovers that he or she needs to engage with other users to perform certain tasks in the game, for example, to rely on "neighbours" in a building simulation game to staff a series of community buildings. The user may send invitations to various social network connections that he or she believes might be interested in participating in the game, intending to invite his or her connections to serve specific roles in an ongoing game. However, some of these connections may not be familiar with the game, or may not have the same level of interest in the game as the requesting user.

Even if the user is able to find social network connections interested in playing the game with the user, some of the connections may be slow at responding to cooperative tasks in the game, or may not be available to regularly participate with the game. Keeping the user interested in game play, particularly for ongoing network-hosted games, will require the involvement of additional active social network connections.

In an example embodiment, a user is provided with a series of graphical user interfaces to review and accept new gaming social network connections that are recommended for the user by the game networking system, the gaming social network, or a combination therein. For example, in the context of the aforementioned building simulation game, the user may notice a "Recommended Neighbours" section that informs the user of potential connections that he or she is not yet connected to, who are playing a common game. The user may view the name, profile, and other relevant information about these recommended connections, and decide whether to establish a gaming social network connection with the user for one or more games or for gaming activities in general. If the user accepts, the new connection will be able to engage in game play with the user, with an intended result of a positive gaming outcome.

Suggesting gaming social network connections to such recommended users may assist the user to maintain game play progress and interaction with the game, especially over a period of time when the user's interest in the game might otherwise diminish. It may also lead to the engagement of the user and the user's new connections with new gaming and social activity in the game networking system or the gaming social network.

The size and composition of a user's gaming social network may vary significantly from other types of social networks that the user may be an active participant in. For example, only a fraction of the user's connections on an out-of-game social network may actively engage in gaming activities at regular times. Likewise, even if a user has a robust network of connections within the gaming social network, many of these connections may not be playing the same games or conducting game play at the same times as the user. Such limitations may be factored by the presently described recommendation techniques to produce relevant recommendations.

In an example embodiment, a series of "matchmaking" or "connection recommendation" techniques are provided for use with a gaming social network, to enable the suggestion of gaming social network connections who are most likely to actively participate in particular games and gaming activities. For example, these recommended connections may be connected to a gaming user in the gaming social network for purposes of serving as a neighbor, teammate, opponent, or other specific player role in a game. Establishment of a robust set of connections in the gaming social network is intended to result in increased gaming time, and an improved gaming experience and game play satisfaction for all involved users.

One technique for performing matchmaking includes both generating and providing recommendations for appropriate users. The processing actions related to generating and providing recommendations may be performed by the same system, but need not be. Data used to suggesting recommended connections for the user's game social network may originate from a variety of data sources, including direct interaction with the user. This data may then be compared with various evaluation criteria, and delivered to the user at appropriate times (e.g., when the user is starting to build his or her gaming social network, or when the user is in great need of teammates for a specific strategy game).

The evaluation criteria for selecting specific users may be derived from or determined as a result of analyzing information stored or associated with a gaming social network user profile of the user, and potential connections extending from the social graph of the user. User profile information relevant to the recommendation process may include one or more of data obtained from the gaming social network identifier, data obtained from the out-of-game social network identifier, data associated with gaming social network connections, game actions, social actions, reputation data, location information, and temporal information.

Recommended connections may be selected from users in either a gaming social network service (e.g., Zynga gaming network, Xbox Live, Steam), or users of an out-of-game social network service (e.g., Facebook, Friendster, MySpace, Google+). Further, the gaming social network system may comprise a subset of users from the out-of-game social network service, such as a "gaming buddies" group of connections in the out-of-game social network service.

As non-limiting examples on how a potential connection can be evaluated, evaluation factors for a potential connection may include how likely the recommended connection will be to participate in a particular game, how often the recommended connection plays a particular game, the amount of overlapping times that the recommended connection and the user play the same game or similar games, similar game interests between the recommended connection and the user, a comparable experience level between the recommended connection and the user, acceptance rate for invitations to the recommended connection, game play reputation and ratings of the recommended user, distance of any social network connection between the user and the recommended connection, common connections and interests between the recommended connection and the user, and the like.

In cases where only a select number of recommended connections are provided to a user, a ranking metric may be used to determine which connections and the order of connections to display to the user. This ranking metric may be based on which recommended connections the user is most likely to accept as connections, which recommended connections are most likely to accept an invitation for a connection, the degree of separation between the recommended connections and the user, and the like.

In an example embodiment, recommended connections may be presented to a user after the establishment or claiming of a user profile account within a gaming social network. This may occur after the user has created a nickname or alias, and has enabled a public or semi-public profile "page" or interface view for display within the gaming social network. Upon the creation of the user profile page, the user may be more likely to expand his or her connections and social network, and provide relevant information for current and potential connections to view about his or her gaming interests. In another example embodiment, the present recommendation and display techniques may be performed independent of any user profile page, such as being integrated into game interfaces.

Figure 6A:
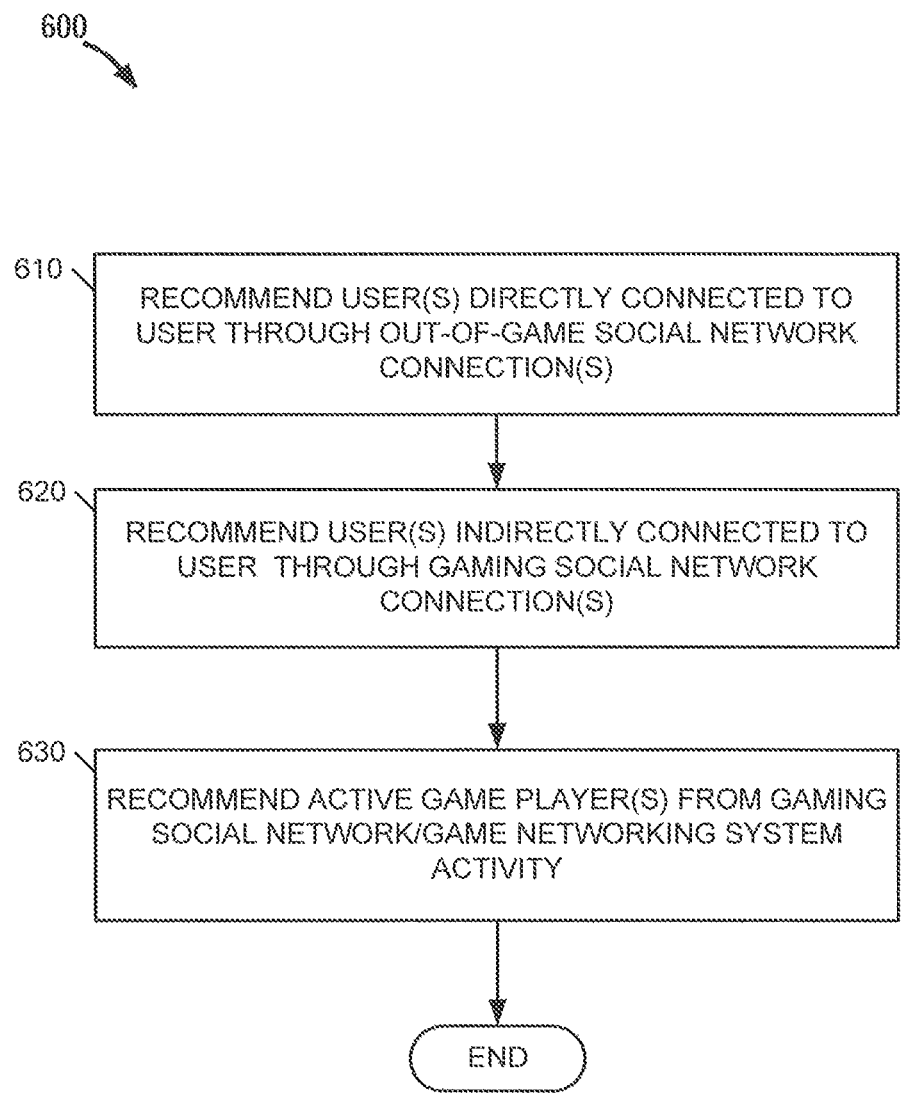
FIGS. 6a and 6b illustrates a flowchart of a method for recommending connections to a gaming social network user according to an example embodiment.

FIG. 6A provides an illustration of a method 600 illustrating a hierarchical flow for selecting sources of gaming social network connection recommendations according to an example embodiment. Although this method 600 is demonstrated in a sequential fashion, it will be understood that variations to the order and type of information processed in each step may occur in accordance with the embodiments described herein.

As shown in operation 610, out-of-game social network connections with the user may be recommended first. As would be evident, persons who have an established friendship or relationship with the user in an existing social network are likely to be receptive to an invitation to join the user's gaming social network. This is particularly likely when the recommended connection is known to engage in game play and is familiar with specific games interfaced with the gaming social network. Producing recommendations of out-of-game social network contacts may factor whether the user's out-of-game social network connections have engaged in the same games as the user, have engaged in similar types of games, have produced user-generated content related to gaming, or might be associated with demographic information that suggests the user is likely to actively play games or engage in activities with the user in the gaming social network.

The recommendations to invite connections from the out-of-game social network may be presented separately or jointly through an interface of the gaming social network or the out-of-game social network. For example, an interface of the gaming social network may provide the ability to send a message or request directly into the out-of-game social network, such that the recommended connection will be able to view and accept the request from within the interface of the out-of-game social network. Other communication techniques external to the gaming social network and the out-of-game social network may also be used to provide connection recommendations and actions upon such connection recommendations, such as a new connection suggestion or a connection invitation directly sent to a user in an email or SMS message.

Next, users connected to the user indirectly through gaming social network connections may be recommended (see operation 620). In an example embodiment, this may include second and third level connections to the user in the gaming social network, which may include connections with mutual friends. Data on the relationship status of the connections may be retrieved from the maintained gaming social network user profile information, or retrieved as necessary from the game networking system, the gaming social network, or the out-of-game social network.

An additional source for connection recommendations may originate from interaction with potential connections in the gaming social network or game networking system (see operation 630). For example, this may include recommending active game players from the gaming social network who have served as teammates or opponents in current or past games. The gaming social network or the game networking system may also recognize notable user generated content produced between two players, or a positive game outcome occurring between two players, in historical or ongoing games, as a basis for future recommendations.

A variety of other criterion may be used for determining recommended users in the gaming social network. For example, users may be matched based on location or geographical-based criteria, temporal criteria (such as being online frequently at overlapping times), language or cultural-based criteria, common or similar group memberships, common or similar social networking profiles (such as common "likes" and profile interests), gaming experience, gaming levels and achievements, and other types of common or similar interests and attributes associated with the recommended connection's gaming social network user profile.

The user may also provide a set of recommendation criteria for to locate users having certain characteristics, which may be accompanied by automatic acceptances of such recommended users. For example, the user may request recommendations of new connections based on geographic-proximity to the user, and the user may have a profile setting configured to automatically connect (and automatically accept) invitations from recommended users with matching geographic proximity. Likewise, a user may specify automated actions (including whether to automatically accept or reject user connection recommendations) based on other criterion such as common networks or groups within a social network.

In one example embodiment, recommended connections that are provided to the user include various second-degree social network recommendations, e.g., recommendations to add a "friend of a friend". These second-degree recommendations may be produced from user profile information for the user and the user's connections to determine potential second degree connections, narrow a listing of the potential second degree connections, and provide connection recommendations to the user as appropriate.

Figure 6B:
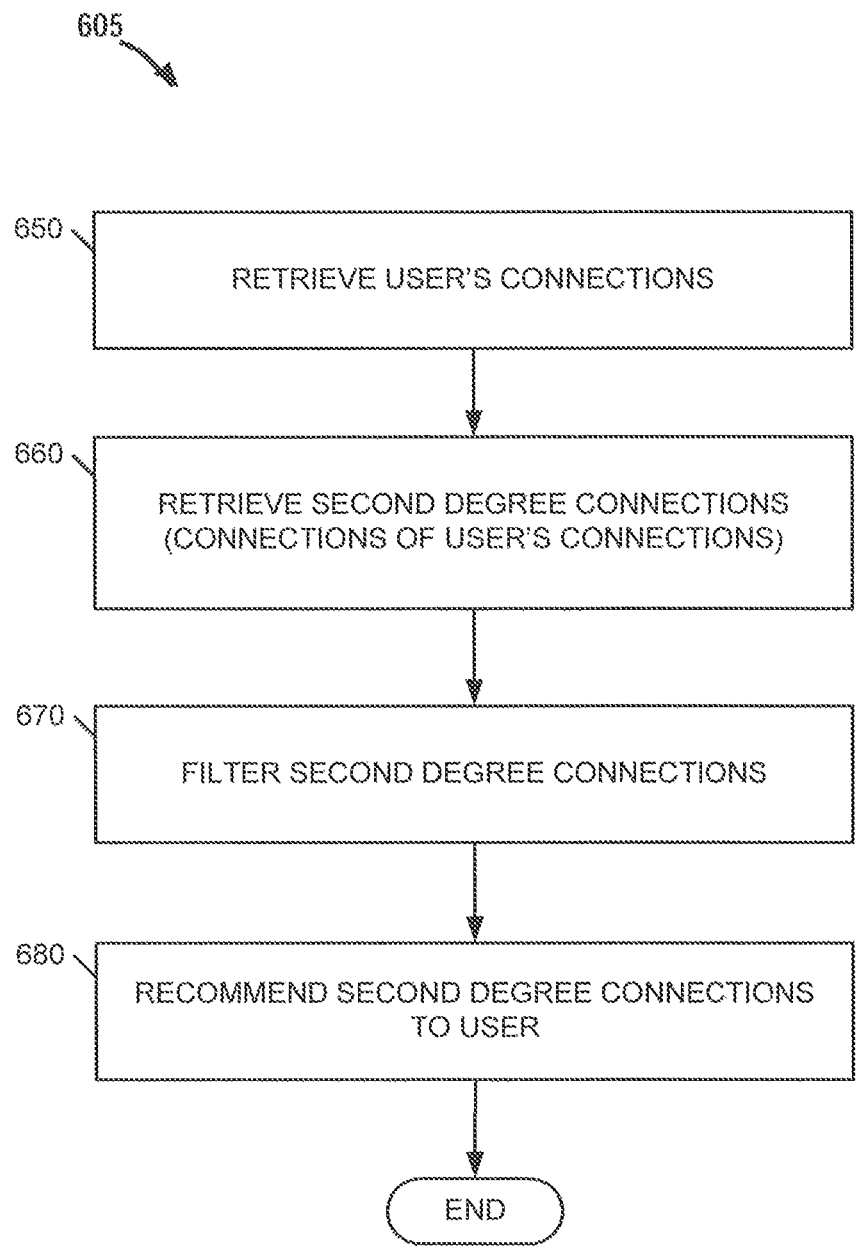

FIG. 6B provides a flowchart 605 of an example method for producing connection recommendations based on second-degree social network connections. In this example method, data is obtained from the user's current user profile information in the gaming social network to obtain a current list of his or her connections in operation 650. For each of the user's connections, a current list of each connection's connections (e.g., a listing of the user's second degree connections), is retrieved in operation 660.

The user may have a relatively large number of second degree connections in the gaming social network, and as a result, all of these second degree connections may not be preferred candidates for display as recommended connections, especially in a simultaneous display. To reduce the number of potential recommendations, the list of possible second degree connections may be filtered in operation 670, based on various connection recommendation preferences or other criteria.

For example, various filtering criteria may include providing recommendations only for second-degree connections active within the gaming social network, or locating certain characteristics in common with the user or the user's connections. In one example embodiment, filtering may be performed by analyzing each of the user's connections, and selecting second degree connections having the highest level of activity in the user's active social network over a period of time (e.g., the connection's most active connections over a previous 7 day period). The potential recommendation's user profile information may be obtained and analyzed for such purposes.

Any listing of recommended users may also be verified, based on various display qualifications, preferences, or connection suitability. For example, the filtering operation 670 may verify that the recommended second degree connection is not already a connection with the user; that the second degree connection has not opted out of receiving system-generated connection recommendations; or that the recommended connection doesn't already have a pending connection request from the user.

In a further example embodiment, certain user's connections may be analyzed and recommended first when recommending second degree connections. For example, locating recommendations for second-degree connections may be most productive when analyzing mutual connections and mutual connection relationships. Other measures such as "helpfulness ratings", reputation scores in games, positive gaming and social outcomes, and like user attributes maintained within the user profile information may also be factored when determining which of the connections to analyze for second degree connections, or recommend as second degree connections.

After the user has accepted, rejected, or ignored the various sets of connection recommendations, additional recommendations may be provided. The number of recommendations provided may be based on system settings, or individual preferences. For example, a user may specify to hide or ignore certain types of recommendations (e.g., to hide recommendations based on past gaming activity or gaming activity in a certain game).

The timing of any connection recommendation display may occur on a regular basis, on a staggered basis over a period of time, or responsive to specific activities occurring within a particular game, the game networking system, or the gaming social network. For example, if a user has not achieved a particular objective of a game after an extended period of time, it may be advantageous to introduce the user to other players at a similar game state to help the user achieve the objective and thus advance in the game. Likewise, user connection recommendations may be presented directly within game play events or dialogs (for example, an in-game dialog suggesting that a user establish a connection with a more experienced user when the user repeatedly fails to achieve some objective in the game).

Figure 6C:
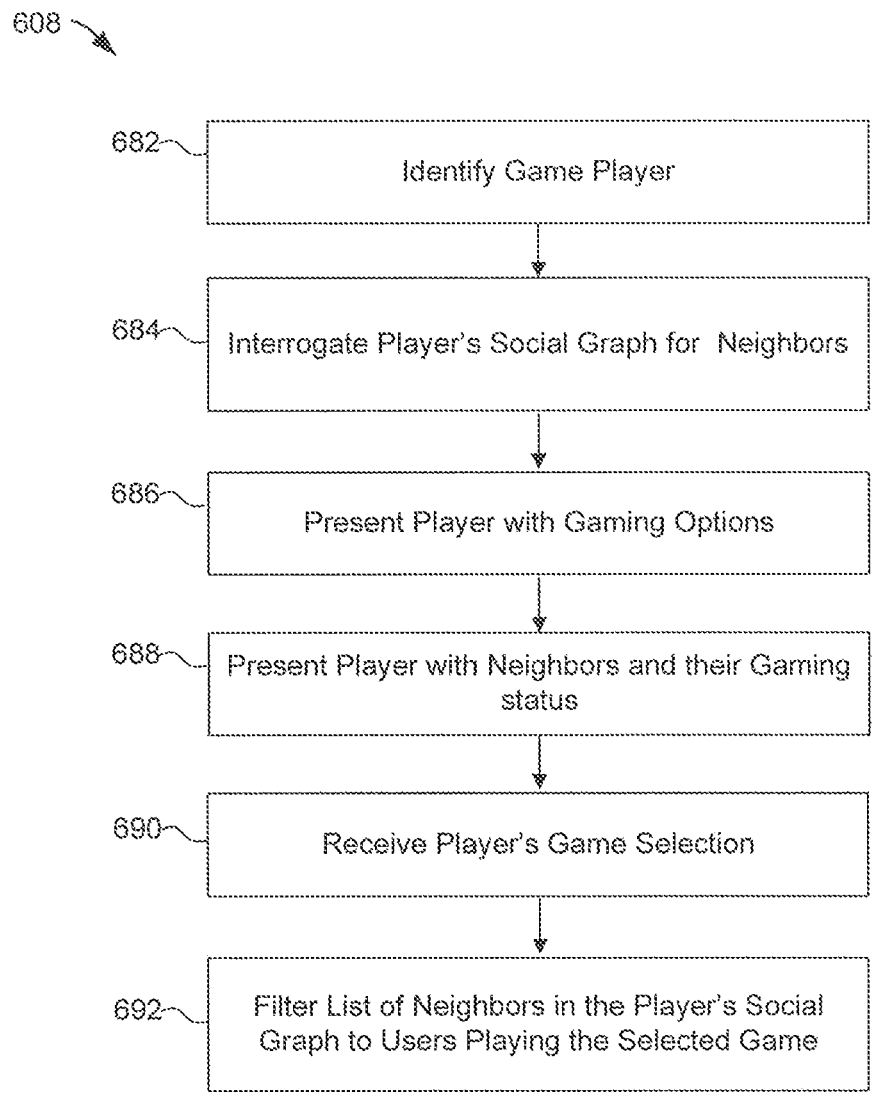
FIG. 6c illustrates a flowchart of a method for determining game play neighbours from multiple out-of-game social networks.

FIG. 6c is a flow chart of an example embodiment of a method 608 of providing a selection of neighbors and gaming options to a player or user. At 680, a gaming networking system can identify a player as having entered or logged-in to the gaming networking system. The player can have accessed the gaming network system directed (e.g., system 108.2) or through one of a plurality of social networking system (e.g., systems 108.1 or 108.3). In one example, the gaming networking system can present the player with a previous game that is still in progress, or a menu screen presenting the user with a plurality of game options. At 684, the gaming networking system can interrogate the player's social graph for potential neighbors for game play. The player's social graph can include both in-game and one or more out-of game social networks. In one example, neighbors can be selected from the player's social graph based on their degree of closeness to the player in the social graph. For example, in one non-limiting embodiment only users that are 2nd degree friends with the player may be presented to the user. In another embodiment potential neighbors may be any other user who the player has previously interacted with in a game in the gaming networking system. Potential neighbors may be actively in a game-play session or may be logged into one of the social networking systems included in the player's social graph.

At 686, the player may be presented with a plurality of gaming options. The gaming options may include all of the available games on the gaming networking system or any subset thereof. At 688, the player may be presented with a list of neighbors including users who are actively playing a game in the gaming networking system, or who are logged into a social networking system and available to join the player in game-play. In an example embodiment the player may be presented with the option of joining a neighbor in a game that is in progress. In another example embodiment the player may be presented with a list of neighbors from which the player may select one or more neighbors to receive an invitation to begin a new game.

At 690, the gaming system receives the player's game play selection and can begin game-play setup. At 692, the gaming system can filter the list of neighbors presented to the player to only those neighbors who are currently engaged in playing the game selected by the player. By filtering the list of neighbors the gaming system can increase the relevancy of suggested neighbors who may be willing to cooperate or participate in game play with the player. In various embodiments, the number of neighbors can be limited to a predetermined value set by the player as a preference setting or the number of neighbors can be dynamically adjusted depending on the size of the player's social graph or the game type.

Presenting Recommended Connections to Users

Figure 7:
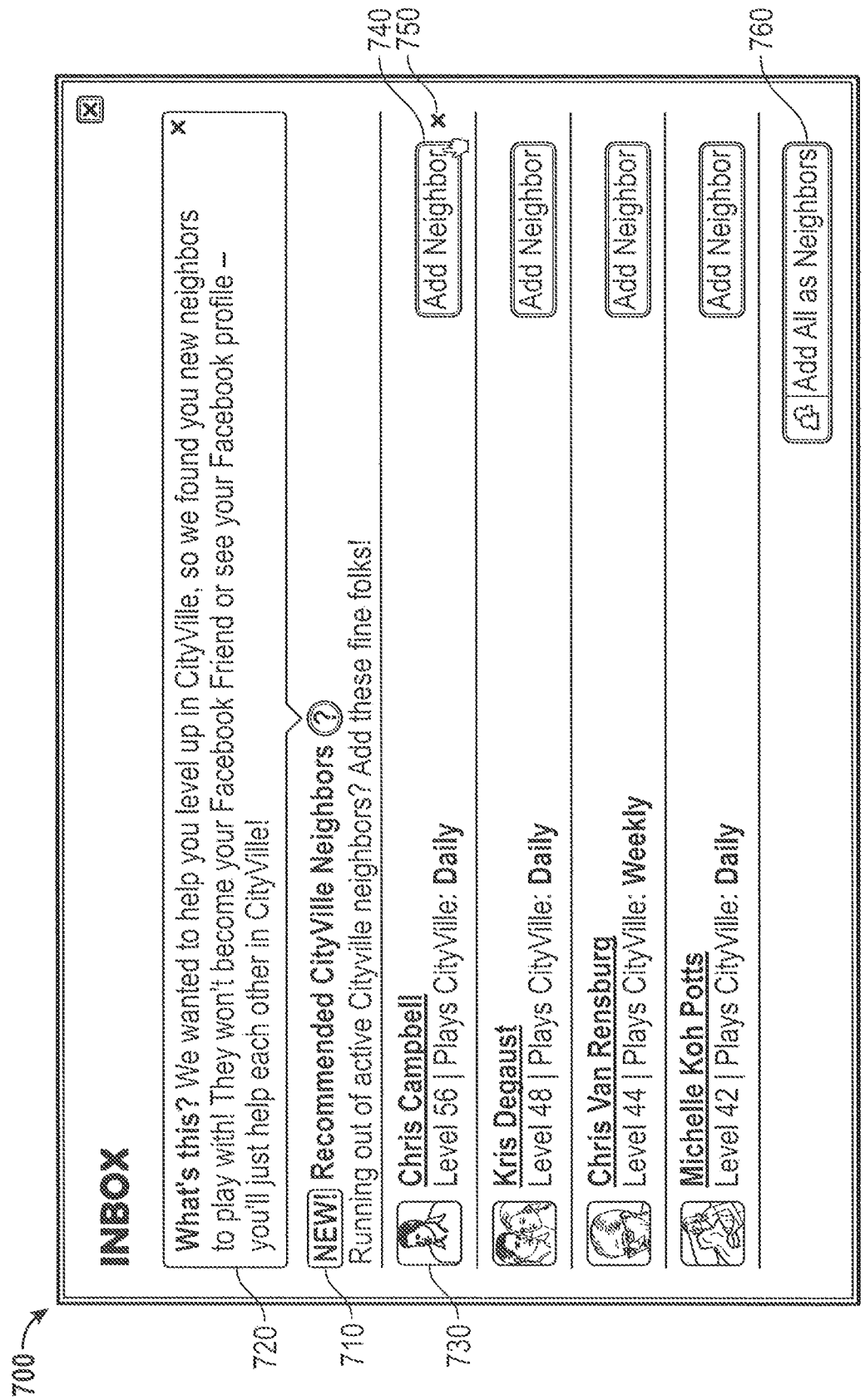
FIG. 7 illustrates a graphical user interface enabling a display of, and interaction with, recommended connections in a gaming social network according to an example embodiment.

FIG. 7 provides an illustration of an example graphical user interface 700 for displaying and accepting recommended connections in a gaming social network. Specifically, FIG. 7 illustrates the recommended connections as being recommended for a game role in a specific game (for example, as a "neighbor" in the "Cityville" building simulation game).

As FIG. 7 illustrates, within the graphical user interface 700 a recommendation listing in 710 for potential gaming social network connections is provided. The recommendation listing in 710 may be accompanied by an explanation in display 720 of why the connection recommendations are being displayed, how the connection recommendations were selected, and the benefits of adding additional connections to the user's gaming social network.

The recommendation listing in 710 includes a display of one or more recommended users including a icon-sized photo of a user in display 730. In an example embodiment, the listing of the recommended user may include a photo, a name or alias, gaming level or experience within a particular game, the frequency of gaming on the network or for a particular game of interest to the user, and other indications relevant to gaming activity and the gaming social network.

The listing of each user may be accompanied by an option to add the specific recommended user as a connection using selectable option 740, or to decline the connection with the user using selectable option 750. The ability to decline may be presented as an option accompanied by related options (e.g., hiding this recommended connection temporarily, hide this recommended connection permanently, hide recommendations for all users of this game, and the like). Further, an option to add all recommended connections with selectable option 760 may be presented to the user in order to accept all displayed recommendations. Likewise, an option may be provided to the user to allow the gaming social network to automatically accept determined connection recommendations.

Upon the user's acceptance of the connection recommendation, a status indicator such as "Connection Request Pending" may be displayed for the user until the recommended connection in turn confirms creation of the connection (e.g., accepts the recommended connection as well). In some embodiments, however, the recommended connection does not need to confirm creation of the connection, and may rely on automated techniques for accepting recommended connections (e.g., automatically accepting all recommended connections who the user has engaged in game play with, and the like).

Figure 8:
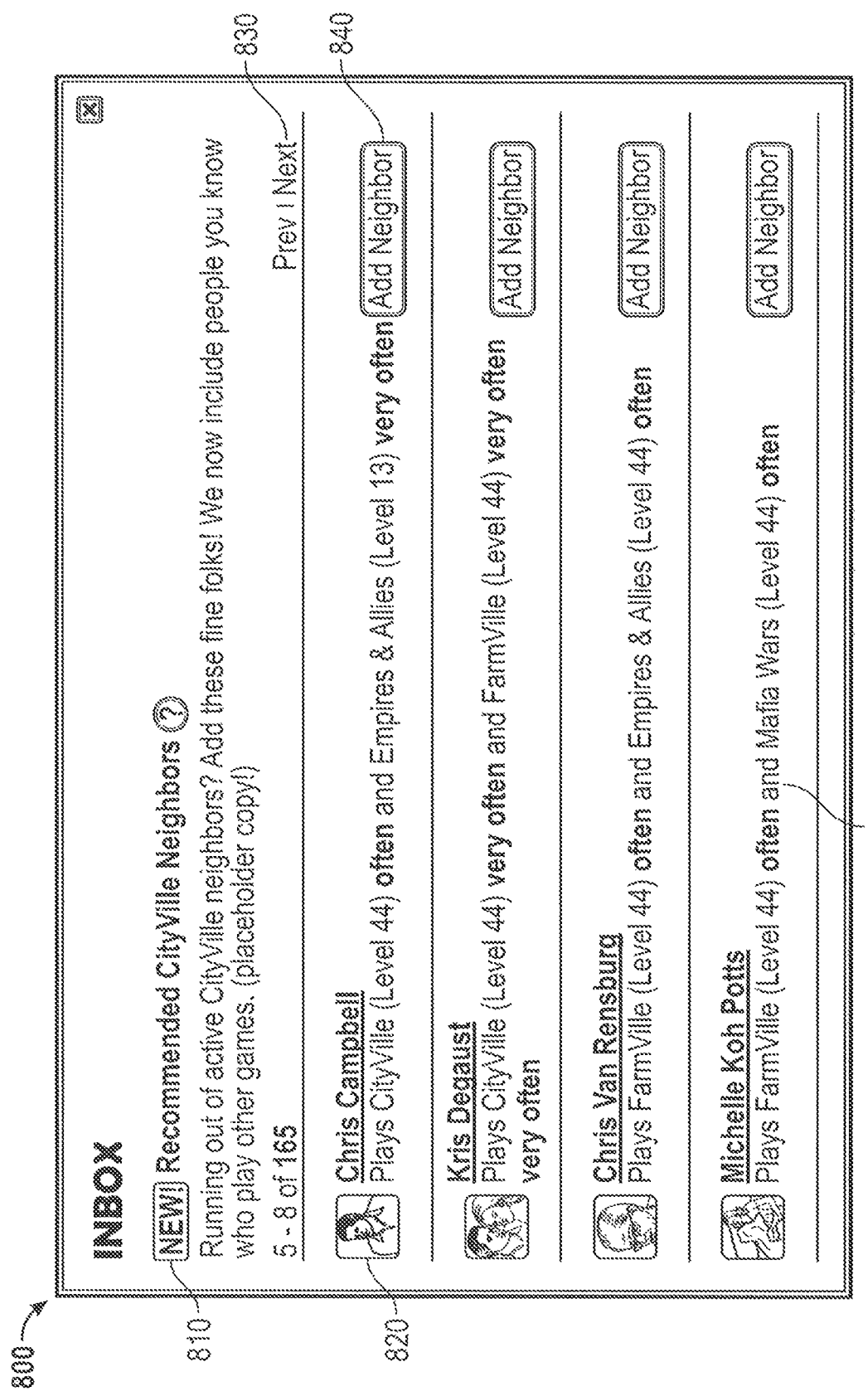
FIG. 8 illustrates a graphical user interface enabling a display of, and interaction with, recommended and user-requested connections in a gaming social network according to an example embodiment.

FIG. 8 provides an illustration of another example graphical user interface 800 for displaying recommended connections in a gaming social network derived from common gaming activity and gaming characteristics with the user. As shown by way of example, an introduction of recommended connections in display 810 is accompanied by a listing of recommended users including a specific recommended user with display 820, options to navigate through the listing of recommended users with selectable option 830, and the ability to accept specific recommended users for connection with selectable option 840.

In addition to the selection criteria based on gaming activity, the user interface 800 may provide a short explanation or text indication 850 to display the amount, type, or experience of gaming activity by the recommended user in one or more games. For example, this may indicate that a particular recommended connection plays two of the user's favorite games at certain intervals (e.g., "daily", "weekly", "often", or "very often"), has reached certain game levels or expertise (e.g., "Level 44"), and the like. Similar actions may be provided for accepting the recommendations and otherwise interacting with the recommended users as previously described for FIG. 7.

Figure 9:
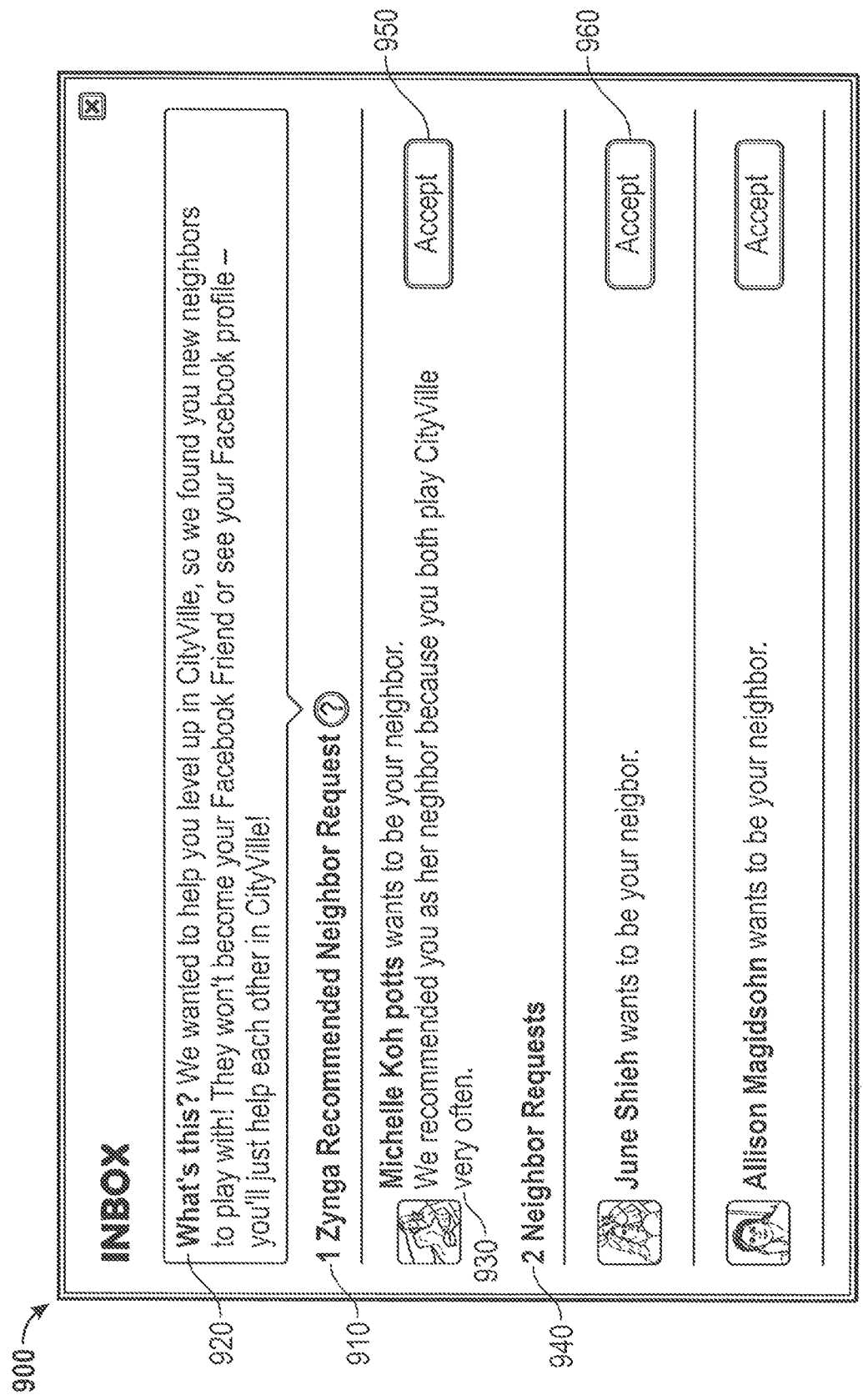
FIG. 9 illustrates a graphical user interface enabling a display of, and interaction with recommended connections in a gaming social network based on user activity in the gaming social network according to an example embodiment.

FIG. 9 provides an illustration of an example graphical user interface 900 displaying recommended connection requests in a gaming social network in addition to user-initiated connection requests, from the perspective of a user who has received both of these requests. As shown, the recommendation listing 910 ("recommended neighbor requests") includes a display of one or more requests from users such as the user identified in display 930 who has responded to a network connection recommendation, accompanied by an explanation in text 920 of why the connection recommendations were produced, how the connection recommendations were generated, and the benefits of accepting the connection in the gaming social network.

As is illustrated in FIG. 9, the listing of recommended connection requests 910 initiated by the gaming social network may be accompanied by a listing of connection requests 940 sent to the user ("neighbor requests") from other users. These connection requests sent to the user may have been manually sent or otherwise initiated from requesting users. The request for establishing a connection between recommended connections may be accepted with selectable option 950 in a similar fashion as the request for establishing a connection with the user-requested connection based on an acceptance selection with selectable option 960. Although the graphical user interface 900 may distinguish between network-recommendations and user-initiated requests and provide the ability to respond to the requests individually, an interface option may be provided to accept all, or reject all, available requests (not shown).

Figure 10:
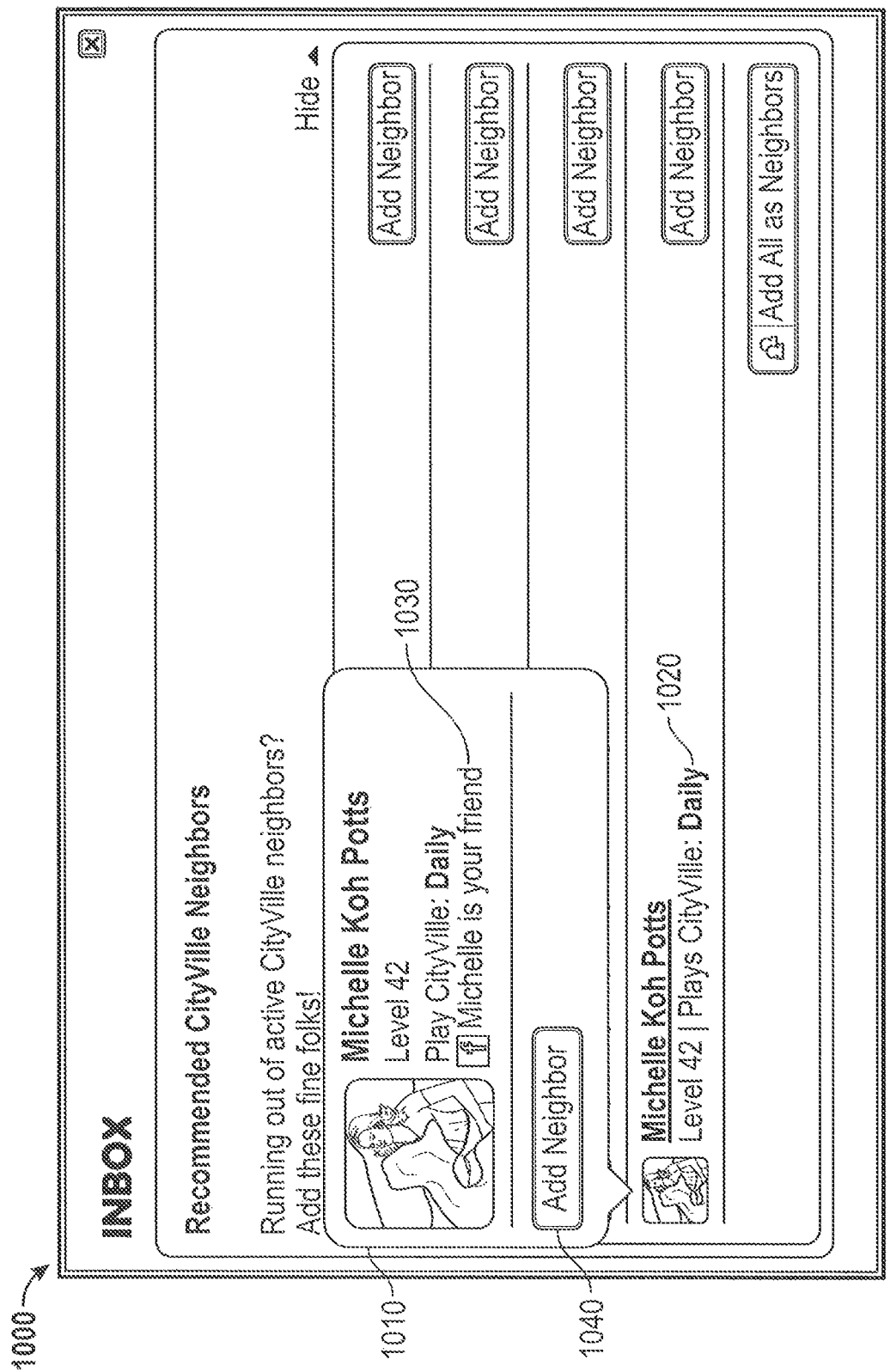
FIG. 10 illustrates a graphical user interface enabling a display of, and interaction with, recommended connections in a gaming social network with use of a summarized connection profile according to an example embodiment.

FIG. 10 provides an illustration of an example graphical user interface 1000 configured for displaying additional information on recommended users, specifically through the use of an popup or overlay window 1010. In addition to the user information displayed on a listing of multiple recommended users as in text display 1020, the overlay window 1010 provides additional context on the relationship between the user and the recommended connection. For example, a status message 1030 within the overlay window may indicate that the user is a connection in the user's out-of-game social network. The overlay window 1010 may provide a direct option to establish a connection as in button display 1040 or may provide other suitable options for interfacing with the recommended connection (e.g., to send a pre-defined or custom message, to find out more information on the recommended connection, and the like).

Figure 11A:
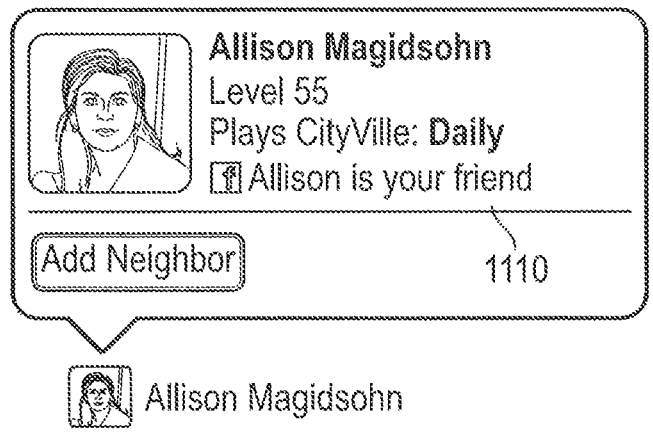
FIGS. 11A, 11B, and 11C illustrate a graphical user interface enabling the display of, and interaction with a potential connection in a gaming social network using various example configurations of a summarized connection profile according to an example embodiment.
Figure 11B:
Figure 11C:
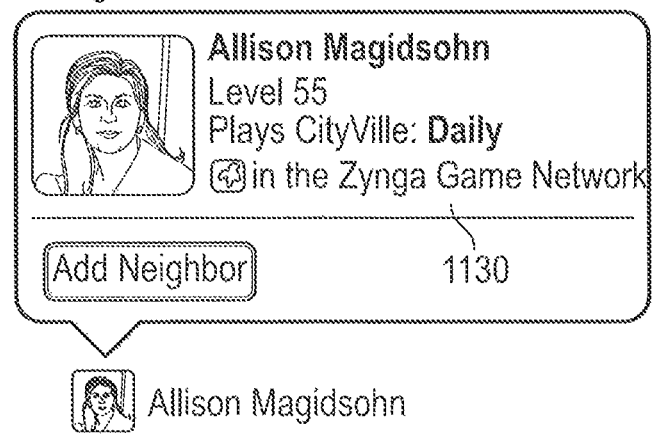

FIGS. 11A, 11B, 11C each provide alternate options for the format and content of the overlay window 1010 according to an example embodiment. For example, as is shown in FIG. 11A, a mini-profile GUI is displayed when the recommended connection is a direct connection with the user in the out-of-game social network. This GUI may provide basic information such as a picture, alias, experience and amount of play related to a certain game, and more details on the direct connection with the user as in display 1110.

FIG. 11B presents an interface that may be displayed when the recommended connection is a indirect connection with the user in the out-of-game social network or the gaming social network, for example, being a mutual friend with one or more friends in the non-gaming social network. Similar to FIG. 11A, the mini-profile GUI may provide basic information on the recommended user such as a picture, alias, experience and amount of play related to a certain game, and more details on the indirect connection with the user as in display 1120.

FIG. 11C presents an interface that may be displayed when the recommended connection is not an existing direct or indirect connection in the user's gaming social network or out-of-game social network, but is an unconnected user in the gaming social network. Similar to FIGS. 11A and 11B, information on the recommended user such as a picture, alias, experience and amount of play related to a certain game, may be provided, and any connection details may be limited to a simple recognition of membership in a common group or the gaming social network as in display 1130.

The types of information that may be displayed on either the overlay window, or in connection with the aforementioned connection recommendation interfaces includes, but does not require and is not limited to: games played by the recommended user, the frequency of play for specific games or on the game networking system for the recommended user (e.g., plays Game A four times per week); the total number of connections established with the recommended user within a gaming social network or within a group or specific game subset of the gaming social network; the number of mutual connections with the user in the out-of-game or the gaming social network; how helpful or cooperative the recommended user is in specific games types of games; whether the recommended user is currently online; the times that the recommended user is most likely to be online; the last activity time of the recommended user; the last activity game of the recommended user; whether the user returns gifts or participates in "crews" or cooperative "teams" for other users; the expertise, experience, or particular level of the recommended user; the number of connections that the recommended user maintains in the gaming social network; responsiveness to requests and social activities within the gaming social network; and like information.

Figure 12:
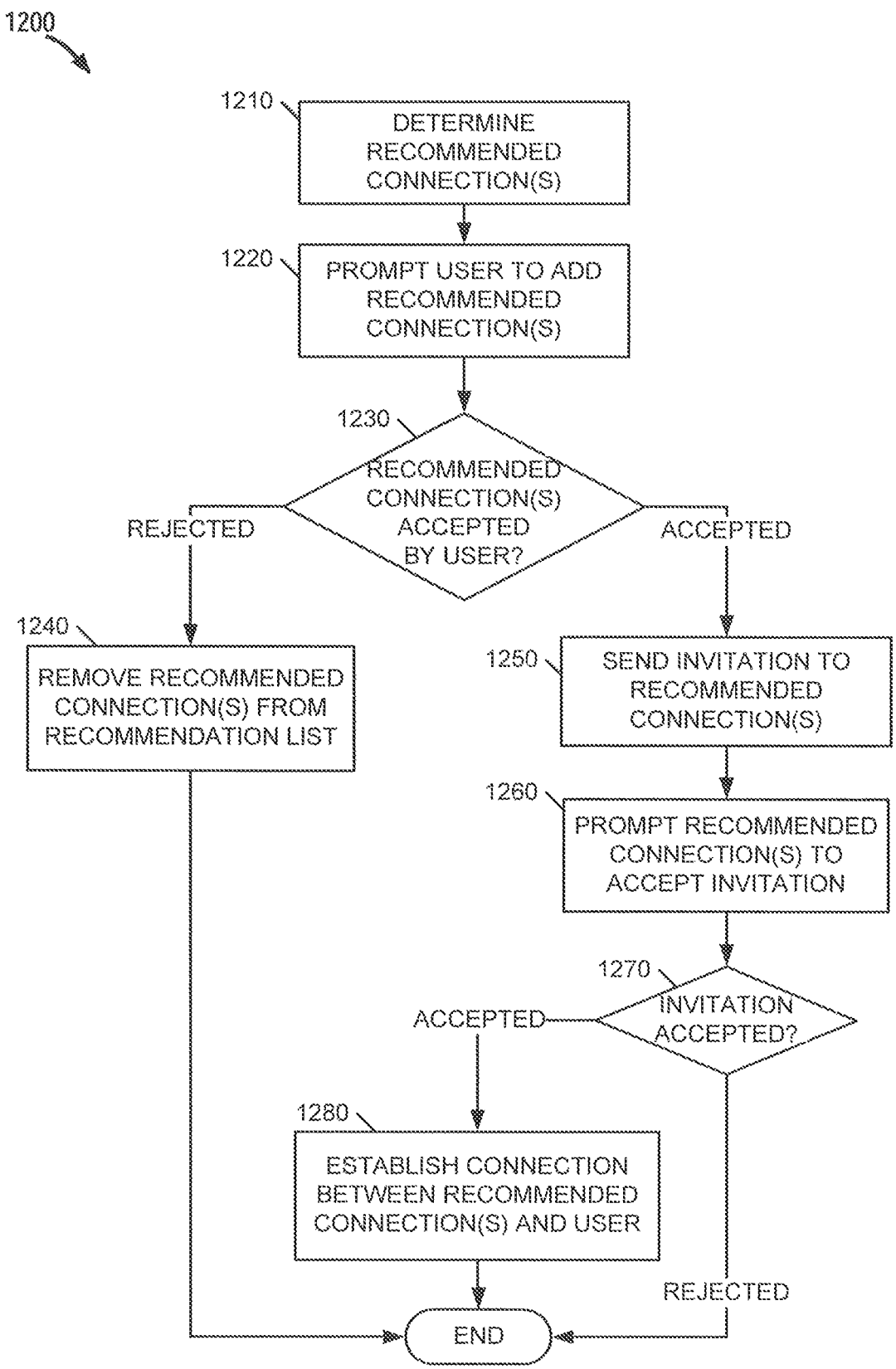
FIG. 12 illustrates a flowchart of a method for providing invitations to recommended connections and establishing connections to the recommended connections in a gaming social network according to an example embodiment.

FIG. 12 provides an illustration of a method 1200 illustrating a flow for recommending connections within a gaming social network according to an example embodiment. As illustrated, recommended user connections in the gaming social network are determined in operation 1210 based on a variety of the aforementioned criteria or relevant techniques. The user is prompted in operation 1220 (such as within a user interface of the out-of-game social network, the gaming social network, the game networking system, or otherwise) to add, accept, or select the recommended connection as a gaming social network connection. If the recommended connections are rejected by the user in operation 1230, then the recommended connection may be removed from the recommendation list in operation 1240. In further embodiments, if the recommended connection is rejected, then the display of this recommended connection within is replaced with another recommended connection.

If the recommended connection is accepted by the user in operation 1230, then further processing to establish the connection may occur. If the recommended connection is ignored and no action is taken on the recommendation, then the recommendation may come up at a future time, remain intact until accepted or rejected, or may disappear after a certain interval of time or after certain actions. For the case where the recommended connection(s) are accepted by the user, the invitation is sent to the recommended connections in operation 1250.

In an example embodiment, the connection is not established between the recommended connection(s) and the user until the recommended connection user confirms or accepts the connection. However, in some gaming environments or gaming social networks, such dual-verification from both the user and the recommended connection is not necessary, but rather a connection may be established on the basis of a connection being accepted by a single actor. Prompting the recommended connection(s) to accept the invitation in operation 1260 may occur in connection with messaging, alerts, or other interfaces with the out-of-game social network; such prompts may also be presented through messaging, alerts, and other suitable interfaces within the game social network and interfaces provided by the game networking system.

If the invitation is accepted in operation 1270, then a connection is established between the recommended connection(s) and the user in operation 1280. If the invitation is rejected in operation 1270, then no connection will be established between the recommended connection(s) and the user. As a result of rejection of the invitation, additional processing may take place to hide other users with similar profiles, modify the user profile of the rejecting user, and the like. Likewise, as a result of acceptance of the invitation, additional processing may take place to show users with similar profiles, modify the user profile of the accepting user, and the like.

Although the aforementioned techniques are described with particular emphasis on gaming environments delivered within computer-based user interfaces, it will be apparent that many of the matchmaking criteria and recommended connection user interface features may also be adapted to social networks and social network interfaces that do not provide games. Therefore, the selection or recommendation enhancements and interfaces may also be applied within a variety of custom and specific social networks. Further, the presently described uses and analysis of user profile information may also be relevant to the analysis of a variety of common interests and activities between users in various types of social networks.

Example Social Networks, Social Graphs, and Gaming Environments

The following provides additional context and explanation of the operation of social networks, example systems implementing such social networks, and examples of gaming environments operable with the presently disclosed techniques. Returning to FIG. 2, the player 201 may be associated, connected, or linked to various other users, or "friends," within the out-of-game social network 250. These associations, connections, or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to the player 201. As used herein, the terms "player" and "user" can be used interchangeably and can refer to any user in an online multiuser game system or social networking system. As used herein, the term "friend" can mean any node within a player's social network.

As shown in FIG. 2, the player 201 has direct connections with several friends. When the player 201 has a direct connection with another individual, that connection is referred to as a first-degree friend. In out-of-game social network 250, the player 201 has two first-degree friends. That is, the player 201 is directly connected to friend $1_1$ 211 and friend $2_1$ 221. In social graph 200, it is possible for individuals to be connected to other individuals through their first-degree friends (e.g., friends of friends). As described above, the number of edges in a minimum path that connects a player to another user is considered the degree of separation. For example, FIG. 2 shows that the player 201 has three second-degree friends to which he is connected via his connection to his first-degree friends. Second-degree friend $1_2$ 212 and friend $2_2$ 222 are connected to the player 201 via his first-degree friend $1_1$ 211. The limit on the depth of friend connections, or the number of degrees of separation for associations, that the player 201 is allowed is typically dictated by the restrictions and policies implemented by the social networking system 108.1.

In various embodiments, the player 201 can have Nth-degree friends connected to him through a chain of intermediary degree friends as indicated in FIG. 2. For example, Nth-degree friend $1_N$ 219 is connected to the player 201 within in-game social network 260 via second-degree friend $3_2$ 232 and one or more other higher-degree friends.

As shown in the example of FIG. 2, the player 201 has out-of-game connections 255 to a plurality of friends, forming the out-of-game social network 250. Here, friend $1_1$ 211 and friend $2_1$ 221 are first-degree friends with the player 201 in his out-of-game social network 250. The player 201 also has in-game connections 265 to a plurality of players, forming in-game social network 260. Here, friend $2_1$ 221, friend $3_1$ 231, and friend $4_1$ 241 are first-degree friends with the player 201 in his in-game social network 260. In some embodiments, a game engine can access the in-game social network 260, the out-of-game social network 250, or both.

In some embodiments, the connections in a player's in-game social network can be formed both explicitly (e.g., when users "friend" each other) and implicitly (e.g., when the system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (e.g., in disintermediated interactions or the like), but that could be the case.

In an online multiplayer game, players control player characters (PCs), a game engine controls non-player characters (NPCs), and the game engine also manages player character state and tracks states for currently active (e.g., online) players and currently inactive (e.g., offline) players. A player character may have a set of attributes and a set of friends associated with the player character, which may or may not correspond to connections and connection user profile attributes in the gaming social network. As used herein, the terms "state" and "attribute" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights, and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a player (or a group of more than one players), the game engine may take into account the state of the player character (or group of PCs) that is playing, but also the state of one or more PCs of offline/inactive players who are connected to the current player (or PC, or group of PCs) through the game social graph but are not necessarily involved in the game at the time.

For example, Player A with six friends on Player A's team (e.g., the friends that are listed as being in the player's mob/gang/set/army/business/crew/etc. depending on the nature of the game) may be playing the virtual game and choose to confront Player B who has 20 friends on Player B's team. In some embodiments, a player may only have first-degree friends on the player's team. In other embodiments, a player may also have second-degree and higher degree friends on the player's team. To resolve the game event, in some embodiments the game engine may total up the weapon strength of the seven members of Player A's team and the weapon strength of the 21 members of Player B's team and decide an outcome of the confrontation based on a random variable applied to a probability distribution that favors the side with the greater total. In some embodiments, all of this may be done without any other current active participants other than Player A (e.g., Player A's friends, Player, B, and Player B's friends could all be offline or inactive). In some embodiments, the friends in a player's team may see a change in their state as part of the outcome of the game event. In some embodiments, the state (assets, condition, level) of friends beyond the first degree are taken into account.

Figure 13:
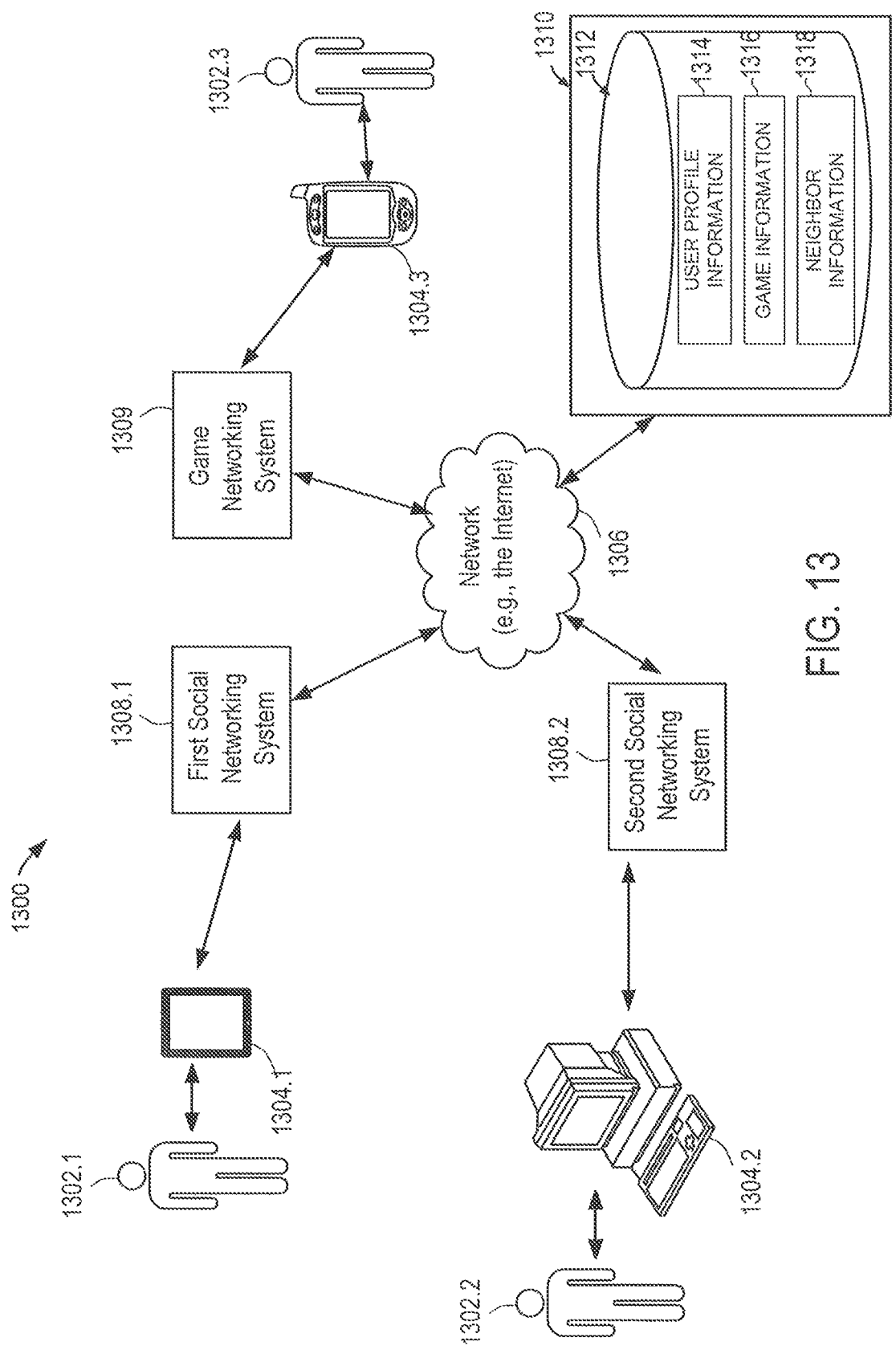
FIG. 13 illustrates a system configured for implementing various disclosed example embodiments.

FIG. 13 illustrates an example of a system for implementing various disclosed embodiments. In particular embodiments, the system 1300 comprises multiple neighbors 1302, a first social networking system 1308.1, a second social networking system 1308.2, a game networking system 1309, multiple client devices 1304 of various types, and a network 1306. The components may be connected directly or over network 1306, which may be any suitable network, for example the Internet.

An example database system 1310 and database 1312 configured to store user profile information 1314 related to the social graphs of multiple users in game or social networking systems connected to the network 1306. In some example embodiments, the database system 1310 may correspond to a database or data store maintained within the social network system 1308, within the game networking system 1309, or a separate computer system or information service that may be accessed by the game networking system 1309.

A specific example of the types of user profile information data that may be maintained within database system 1310, include user profile information 1314 that may be associated with individual users on one or more networking or gaming systems; game information 1316 related to current or past gaming activities for each user; and neighbor information 1318 that may include relationships between separate users' social graphs. User profile information 1314 may include a unique identifier for each user who has accessed game networking system 1309 as well as a link between that unique identifier and the user's identity on one or more social networking systems 1308. User profile information 1314 may also include a summary or complete copy of the user's social graph, including any social graphs imported from a separate social network 1308. Game information may include a user's current and past game play statistics and preferences. In an example, neighbor information 1318 may include data indicating sets of users that are currently interacting (e.g., logged-on) to game networking system 1309 either directly or through a social networking system 1308 and may be receptive to coordinated or competitive game play. In another example, neighbor information 1318 may include information indicating that individuals in a user's social graph are potential neighbors, preferred neighbors, or blocked individuals. Potential neighbors may be individuals in the user's social graph who are within a preset criteria. (e.g., degree of friendship, or previous game play). Potential neighbors may be individuals a user has indicated are desirable for game play in one or more games, or individuals that a game networking system has determined are recent or regular co-participants in gaming activities. In another example, neighbor information 1318 may include a plurality of social graphs obtained from multiple gaming networks or social networks that the user has accessed for game-play, and indications of specific individuals in any one of the plurality of social graphs who have separately or jointly played any of a plurality of games offered by a gaming network.

Data Flow

Figure 14:
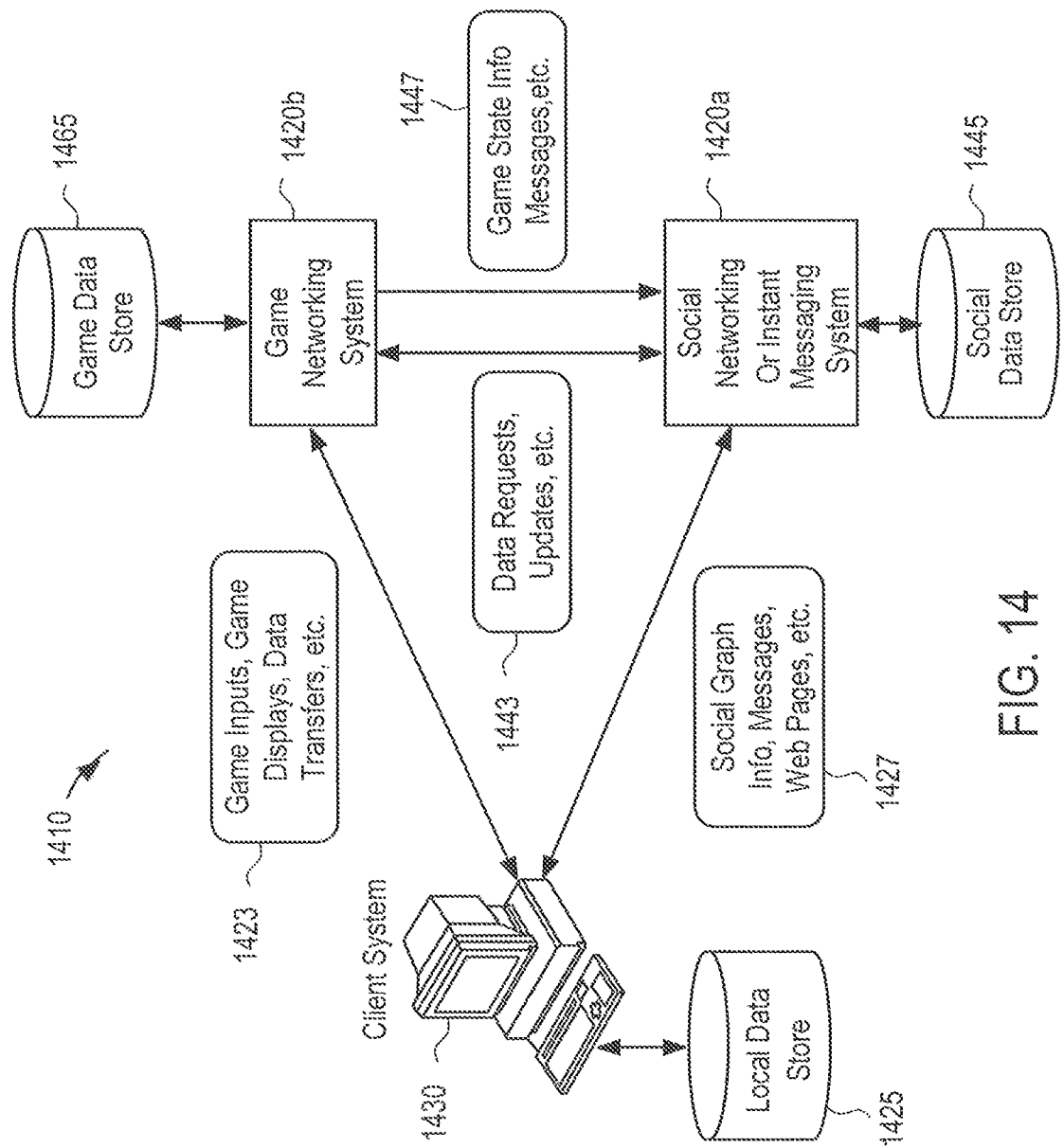
FIG. 14 illustrates a block diagram of an example data flow between the components of a system.

FIG. 14 is a block diagram illustrating an example data flow between the components of system 1410. In particular embodiments, system 1410 can include client system 1430, social networking system 1420*a*, and game networking system 1420*b*. The components of system 1410 can be connected to each other in any suitable configuration, using any suitable type of connection. The components may be connected directly or over any suitable network. Client system 1430, social networking system 1420*a*, and game networking system 1420*b* can each have one or more corresponding data stores such as local data store 1425, social data store 1445, and game data store 1465, respectively. Social networking system 1420*a* and game networking system 1420*b* can also have one or more servers that can communicate with client system 1430 over an appropriate network. Social networking system 1420*a* and game networking system 1420*b* can have, for example, one or more internet servers for communicating with client system 1430 via the Internet. Similarly, social networking system 1420*a* and game networking system 1420*b* can have one or more mobile servers for communicating with client system 1430 via a mobile network (e.g., GSM, PCS, Wi-Fi, WPAN, etc.). In some embodiments, one server may be able to communicate with client system 1430 over both the Internet and a mobile network. In other embodiments, separate servers can be used.

Client system 1430 can receive and transmit data 1423 to and from game networking system 1420*b*. This data can include, for example, webpages, messages, game inputs, game displays, HTTP packets, data requests, transaction information, updates, and other suitable data. At some other time, or at the same time, game networking system 1420*b* can communicate data 1443, 1447 (e.g., game state information, game system account information, page info, messages, data requests, updates, etc.) with other networking systems, such as social networking system 1420*a* (e.g., Facebook, Myspace, etc.). Client system 1430 can also receive and transmit data 1427 to and from social networking system 1420*a*. This data can include, for example, webpages, messages, social graph information, social network displays, HTTP packets, data requests, transaction information, updates, and other suitable data.

Communication between client system 1430, social networking system 1420*a*, and game networking system 1420*b* can occur over any appropriate electronic communication medium or network using any suitable communications protocols. For example, client system 1430, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HTML documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 1420*b*, the BLOB containing the game state for the instance corresponding to the player can be transmitted to client system 1430 for use by a client-side executed object to process. In particular embodiments, the client-side executable may be a Flash-based game, which can de-serialize the game state data in the BLOB. As a player plays the game, the game logic implemented at client system 1430 maintains and modifies the various game state parameters locally. The client-side game logic may also batch game events, such as mouse clicks, and transmit these events to game networking system 1420*b*. Game networking system 1420*b* may itself operate by retrieving a copy of the BLOB from a database or an intermediate memory cache (memcache) layer. Game networking system 1420*b* can also de-serialize the BLOB to resolve the game state parameters and execute its own game logic based on the events in the batch file of events transmitted by the client to synchronize the game state on the server side. Game networking system 1420*b* may then re-serialize the game state, now modified, into a BLOB and pass this to a memory cache layer for lazy updates to a persistent database.

With a client-server environment in which the online games may run, one server system, such as game networking system 1420*b*, may support multiple client systems 1430. At any given time, there may be multiple players at multiple client systems 1430 all playing the same online game. In practice, the number of players playing the same game at the same time may be very large. As the game progresses with each player, multiple players may provide different inputs to the online game at their respective client systems 1430, and multiple client systems 1430 may transmit multiple player inputs and/or game events to game networking system 1420*b* for further processing. In addition, multiple client systems 1430 may transmit other types of application data to game networking system 1420*b*.

In particular embodiments, a computed-implemented game may be a text-based or turn-based game implemented as a series of web pages that are generated after a player selects one or more actions to perform. The web pages may be displayed in a browser client executed on client system 1430. As an example and not by way of limitation, a client application downloaded to client system 1430 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 1420*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 1430, either caused by an action of a game player or by the game logic itself, client system 1430 may need to inform game networking system 1420*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 1410 is discussed in reference to updating a multi-player online game hosted on a network-addressable system (such as, for example, social networking system 1420*a* or game networking system 1420*b*), where an instance of the online game is executed remotely on a client system 1430, which then transmits application event data to the hosting system such that the remote game server synchronizes the game state associated with the instance executed by the client system 1430.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 1430 may include a Flash client. The Flash client may be configured to receive and run Flash applications or game object codes from any suitable networking system (such as, for example, social networking system 1420*a* or game networking system 1420*b*). In particular embodiments, the Flash client may be run in a browser client executed on client system 1430. A player can interact with Flash objects using client system 1430 and the Flash client. The Flash objects can represent a variety of in-game objects. Thus, the player may perform various in-game actions on various in-game objects by making various changes and updates to the associated Flash objects.

In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object.

To ensure synchronization between the Flash object shown to the player at client system 1430, the Flash client may send the events that caused the game state changes to the in-game object to game networking system 1420*b*. However, to expedite the processing and hence the speed of the overall gaming experience, the Flash client may collect a batch of some number of events or updates into a batch file. The number of events or updates may be determined by the Flash client dynamically or determined by game networking system 1420*b* based on server loads or other factors. For example, client system 1430 may send a batch file to game networking system 1420*b* whenever fifty updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 1430. In particular embodiments, the batch file may be a text file and the name-value pairs may be in string format.

In particular embodiments, when a player plays an online game on client system 1430, game networking system 1420*b* may serialize all the game-related data, including, for example and without limitation, game states, game events, and user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 1420*b* may retrieve the corresponding BLOB from the database to determine the most-recent values of the game-related data. In particular embodiments, while a player is playing the online game, game networking system 1420*b* may also load the corresponding BLOB into a memory cache so that the game system may have faster access to the BLOB and the game-related data contained therein.

Example Game Networking Systems and Implementations

Returning to FIG. 1*b*, the components of system 150 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or another type of connection, or a combination of two or more such connections. Connections 110 need not necessarily be the same throughout system 150. One or more first connections 110 may differ in one or more respects from one or more second connections 110. Although FIG. 1*b* illustrates particular connections between player 102, social networking system 108.1, game networking system 108.2, client device 104, and network 106, this disclosure contemplates any suitable connections between player 102, social networking system 108.1, game networking system 108.2, client device 104, and network 106. As an example and not by way of limitation, in particular embodiments, client device 104 may have a direct connection to social network system 108.1 or game networking system 108.2, bypassing network 106.

A virtual game may be hosted by the game networking system 108.2, which can be accessed using any suitable connection 110 with a suitable client device 104. A player may have a game account on the game networking system 108.2, wherein the game account may contain a variety of information associated with the player (e.g., the player's personal information, financial information, purchase history, player character state, game state, etc.). In some embodiments, a player may play multiple games on the game networking system 108.2, which may maintain a single game account for the player with respect to the multiple games, or multiple individual game accounts for each game with respect to the player. In some embodiments, the game networking system 108.2 may assign a unique identifier to a player 102 of a virtual game hosted on the game networking system 108.2. The game networking system 108.2 may determine that the player 102 is accessing the virtual game by reading the user's cookies, which may be appended to HTTP requests transmitted by the client device 104, and/or by the player 102 logging onto the virtual game.

In some embodiments, the player 102 accesses a virtual game and control the game's progress via the client device 104 (e.g., by inputting commands to the game at the client device 104). The client device 104 can display the game interface, receive inputs from the player 102, transmit user inputs or other events to the game engine, and receive instructions from the game engine. The game engine can be executed on any suitable system (such as, for example, the client device 104, the social networking system 108.1, or the game networking system 108.2). For example, the client device 104 may download client components of a virtual game, which are executed locally, while a remote game server, such as the game networking system 108.2, provides backend support for the client components and may be responsible for maintaining application data of the game, processing the inputs from the player 102, updating and/or synchronizing the game state based on the game logic and each input from the player 102, and transmitting instructions to the client device 104. As another example, when the player 102 provides an input to the game through the client device 104 (such as, for example, by typing on the keyboard or clicking the mouse of the client device 104), the client components of the game may transmit the player's input to the game networking system 108.2.

In some embodiments, the player 102 accesses particular game instances of a virtual game. A game instance is a copy of a specific game play area that is created during runtime. In some embodiments, a game instance is a discrete game play area where one or more players 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific players. A game instance is associated with a specific player when one or more game parameters of the game instance are associated with the specific player. For example, a game instance associated with a first player may be named "First Player's Play Area." This game instance may be populated with the first player's PC and one or more in-game objects associated with the first player.

In some embodiments, a game instance associated with a specific player is only accessible by that specific player. For example, a first player may access a first game instance when playing a virtual game, and this first game instance may be inaccessible to all other players. In other embodiments, a game instance associated with a specific player is accessible by one or more other players, either synchronously or asynchronously with the specific player's game play. For example, a first player may be associated with a first game instance, but the first game instance may be accessed by all first-degree friends in the first player's social network.

In some embodiments, the set of in-game actions available to a specific player is different in a game instance that is associated with this player compared to a game instance that is not associated with this player. The set of in-game actions available to a specific player in a game instance associated with this player may be a subset, superset, or independent of the set of in-game actions available to this player in a game instance that is not associated with him. For example, a first player may be associated with Blackacre Farm in an online farming game, and may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, one or more objects of the virtual game may be represented as a Flash object. Flash may manipulate vector and raster graphics, and supports bidirectional streaming of audio and video. "Flash" may mean the authoring environment, the player, or the application files. In particular embodiments, the client device 104 may include a Flash client. The Flash client may be configured to receive and run Flash application or game object code from any suitable networking system (such as, for example, the social networking system 108.1 or the game networking system 108.2). In particular embodiments, the Flash client may be run in a browser client executed on the client device 104. A player can interact with Flash objects using the client device 104 and the Flash client. The Flash objects can represent a variety of in-game objects. Thus, the player may perform various in-game actions on various in-game objects by making various changes and updates to the associated Flash objects.

In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure describes performing any suitable in-game action by interacting with any suitable Flash object. In particular embodiments, when the player makes a change to a Flash object representing an in-game object, the client-executed game logic may update one or more game state parameters associated with the in-game object.

To ensure synchronization between the Flash object shown to the player at the client device 104, the Flash client may send the events that caused the game state changes to the in-game object to the game networking system 108.2. However, to expedite the processing and hence the speed of the overall gaming experience, the Flash client may collect a batch of some number of events or updates into a batch file. The number of events or updates may be determined by the Flash client dynamically or determined by the game networking system 108.2 based on server loads or other factors. For example, the client device 104 may send a batch file to the game networking system 108.2 whenever 50 updates have been collected or after a threshold period of time, such as every minute.

In particular embodiments, when the player 102 plays the virtual game on the client device 104, the game networking system 108.2 may serialize all the game-related data, including, for example and without limitation, game states, game events, user inputs, for this particular user and this particular game into a binary large object (BLOB) and store the BLOB in a database. The BLOB may be associated with an identifier that indicates that the BLOB contains the serialized game-related data for a particular player and a particular virtual game. In particular embodiments, while a player is not playing the virtual game, the corresponding BLOB may be stored in the database. This enables a player to stop playing the game at any time without losing the current state of the game the player is in. When a player resumes playing the game next time, game networking system 108.2 may retrieve the corresponding BLOB from the database to determine the most-recent values of the game-related data.

In particular embodiments, while a player is playing the virtual game, the game networking system 108.2 may also load the corresponding BLOB into a memory cache so that the game system may have faster access to the BLOB and the game-related data contained therein.

In particular embodiments, one or more described web pages may be associated with a networking system or networking service. However, alternate embodiments may have application to the retrieval and rendering of structured documents hosted by any type of network addressable resource or website. Additionally, as used herein, a user may be an individual, a group, or an entity (such as a business or third-party application).

In particular embodiments, one or more web pages providing the aforementioned gaming social network may be associated with a networking system or networking service. However, alternate embodiments may utilize various software applications to result in the retrieval and rendering of structured documents hosted by any type of network addressable resource or website. Additionally, as used herein, a user may be an individual, a group, or an entity (such as a business or third-party application).

Figure 15:
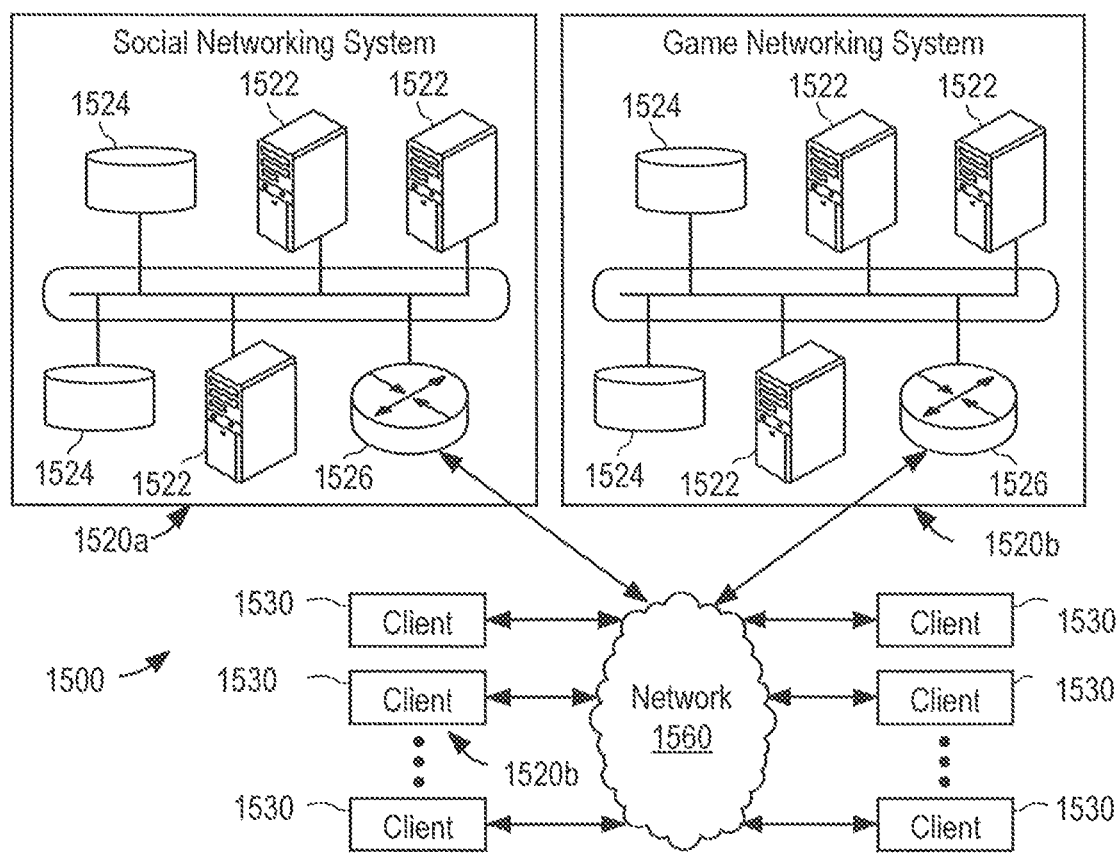
FIG. 15 illustrates a network environment, in which various example embodiments may operate.

Particular embodiments may operate in a wide area network environment, such as the Internet, including multiple network addressable systems. FIG. 15 illustrates an example network environment 1500 in which various example embodiments may operate. The network environment 1500 may include a network cloud 1560 that generally represents one or more interconnected networks, over which the systems and hosts described herein, can communicate. The network cloud 1560 may include packet-based wide area networks (such as the Internet), private networks, wireless networks, satellite networks, cellular networks, paging networks, and the like. As FIG. 15 illustrates, particular embodiments may operate in the network environment 1500 comprising one or more networking systems, such as a social networking system 1520*a*, a game networking system 1520*b*, and one or more client systems 1530. The components of the social networking system 1520*a* and the game networking system 1520*b* operate analogously; as such, hereinafter they may be referred to simply as the networking system 1520. The client systems 1530 are operably connected to the network environment 1500 via a network service provider, a wireless carrier, or any other suitable means.

The networking system 1520 is a network addressable system that, in various example embodiments, comprises one or more physical servers 1522 and data stores 1524. The one or more physical servers 1522 are operably connected to network cloud 1560 via, by way of example, a set of routers and/or networking switches 1526. In an example embodiment, the functionality hosted by the one or more physical servers 1522 may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

The network environment 1500 may include physical servers 1522 that may host functionality directed to the operations of the networking system 1520. Hereinafter the servers 1522 may be referred to as the server 1522, although the server 1522 may include numerous servers hosting, for example, the networking system 1520, as well as other content distribution servers, data stores, and databases. The network environment 1500 may also include a data store 1524 that may store content and data relating to, and enabling, operation of the networking system 1520 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, the data store 1524 corresponds to one or more of a variety of separate and integrated databases (such as relational databases and object-oriented databases) that maintain information as an integrated collection of logically related records or files stored on one or more physical systems. Structurally, data store 1524 may generally include one or more of a large class of data storage and management systems. In particular embodiments, the data store 1524 may be implemented by any suitable physical system(s) including components, such as one or more database servers, mass storage media, media library systems, storage area networks, data storage clouds, and the like. In one example embodiment, data store 1524 includes one or more servers, databases (e.g., MySQL), and/or data warehouses. The data store 1524 may include data associated with different networking system 1520 users and/or client systems 1530.

The client system 1530 is generally a computer or computing device including functionality for communicating (e.g., remotely) over a computer network. The client system 1530 may be a desktop computer, laptop computer, personal digital assistant (PDA), in- or out-of-car navigation system, smart phone or other cellular or mobile phone, or mobile gaming device, among other suitable computing devices. The client system 1530 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of the client system 1530 to enter addresses of specific network resources to be retrieved, such as resources hosted by the networking system 1520. These addresses can be URLs and the like. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

A web page or resource embedded within a web page, which may itself include multiple embedded resources, may include data records, such as plain textual information, or more complex digitally-encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a web page may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at the client system 1530 desires to view a particular web page (hereinafter also referred to as target structured document) hosted by the networking system 1520, the user's web browser, or other document rendering engine or suitable client application, formulates and transmits a request to the networking system 1520. The request generally includes a URL or other document identifier as well as metadata or other information. By way of example, the request may include information identifying the user, such as a user ID, as well as information identifying or characterizing the web browser or operating system running on the user's client system 1530. The request may also include location information identifying a geographic location of the user's client system 1530 or a logical network location of the user's client system 1530. The request may also include a timestamp identifying when the request was transmitted.

Although the example network environment 1500 described above and illustrated in FIG. 15 is described with respect to the social networking system 1520a and the game networking system 1520b, this disclosure encompasses any suitable network environment using any suitable systems. As an example and not by way of limitation, the network environment may include online media systems, online reviewing systems, online search engines, online advertising systems, or any combination of two or more such systems.

Figure 16:
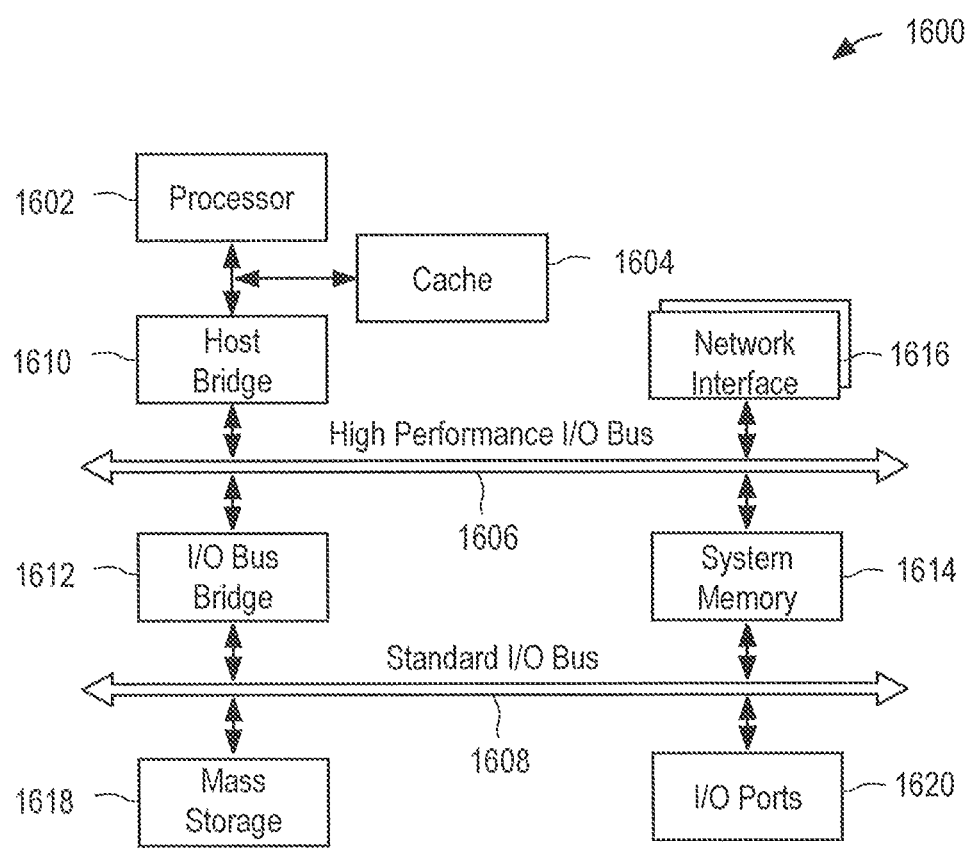
FIG. 16 illustrates an example computing system architecture, which may be used to implement a server or a client system and deploy one or more of the methodologies described herein.

FIG. 16 illustrates an example computing system architecture, which may be used to implement the server 1522 or the client system 1530. In an example embodiment, a hardware system 1600 comprises a processor 1602, a cache memory 1604, and one or more executable modules and drivers, stored on a tangible computer-readable medium, directed to the functions described herein. Additionally, hardware system 1600 may include a high performance input/output (I/O) bus 1606 and a standard I/O bus 1608. A host bridge 1610 may couple the processor 1602 to a high performance I/O bus 1606, whereas an I/O bus bridge 1612 couples the two buses 1606 and 1608 to each other. A system memory 1614 and one or more network/communication interfaces 1616 may couple to the bus 1606. The hardware system 1600 may further include video memory (not shown) and a display device coupled to the video memory. A mass storage 1618 and I/O ports 1620 may couple to the bus 1608. The hardware system 1600 may optionally include a keyboard, a pointing device, and a display device (not shown) coupled to the bus 1608. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1600 are described in greater detail below. In particular, the network interface 1616 provides communication between the hardware system 1600 and any of a wide range of networks, such as an Ethernet (e.g., IEEE 802.3) network, a backplane, etc. The mass storage 1618 provides permanent storage for the data and programming instructions to perform the above-described functions implemented in the servers 1522 of FIG. 15, whereas the system memory 1614 (e.g., DRAM) provides temporary storage for the data and programming instructions when executed by the processor 1602. The I/O ports 1620 are one or more serial and/or parallel communication ports that provide communication between additional peripheral devices, which may be coupled to the hardware system 1600.

The hardware system 1600 may include a variety of system architectures, and various components of the hardware system 1600 may be rearranged. For example, the cache memory 1604 may be on-chip with the processor 1602. Alternatively, the cache memory 1604 and the processor 1602 may be packed together as a "processor module," with the processor 1602 being referred to as the "processor core." Furthermore, certain embodiments of the present disclosure may not include all of the above components. For example, the peripheral devices shown coupled to the standard I/O bus 1608 may couple to the high performance I/O bus 1606. In addition, in some embodiments, only a single bus may exist, with the components of the hardware system 1600 being coupled to the single bus. Furthermore, the hardware system 1600 may include additional components, such as additional processors, storage devices, or memories.

An operating system manages and controls the operation of the hardware system 1600, including the input and output of data to and from software applications (not shown). The operating system provides an interface between the software applications being executed on the hardware system 1600 and the hardware components of the hardware system 1600. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Certain embodiments are described herein may include or be embodied in logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Miscellaneous

One or more features from any embodiment may be combined with one or more features of any other embodiment without departing from the scope of the disclosure. A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. For example, the methods, game features, and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure.

What is claimed is:

1. A computer-implemented method, comprising:
   receiving game play information pertaining to one or more computer-implemented online games, at a server, from devices coupled to the server, wherein each device is associated with at least one of a group of users;
   generating a recommendation of a potential connection from the group of users for a selected user in a social network based at least in part on:
      user profile information maintained for the selected user;
      the game play information associated with the group of users; and
      respective game-play states of a set of players comprising one of:
         a plurality of players in a gameplay graph of the selected user, the gameplay graph being an in-game social graph for an associated game; or
         a plurality of players in a social graph of the selected user, the social graph being an out-of-game network or users;
   providing the recommendation to the selected user for accepting, at a device in communication with the server, wherein the recommendation includes a portion of the game play information associated with the potential connection; and
   responsive to receiving acceptance by the selected user of the recommendation with respect to a candidate user indicated by the potential connection, establishing a connection between the selected user and the accepted user within the social network.

2. The method of claim 1, wherein the user profile information includes social graph information retrieved from a second social network.

3. The method of claim 2, further comprising:
   receiving a first social graph from the second social network, and
   receiving a first gameplay graph from a gaming network;
   wherein the recommendation of the potential connection for the selected user is based on the game play information associated with a plurality of users present in both the first social graph and the first gameplay graph.

4. The method of claim 1, wherein the recommendation of the potential connection is based on game play information that includes past cooperation or competition with the selected user.

5. The method of claim 1, wherein the user profile information includes a contact list provided by the selected user that is separate from the social network.

6. The method of claim 5, further comprising: combining a first social graph with a first gameplay graph to generate the social network.

7. The method of claim 1, wherein the connection is limited to a specific game.

8. The method of claim 7, further comprising:
   maintaining separate social networks for a plurality of games offered in a game networking system.

9. The method of claim 1, wherein the recommendation identifies recommended game play participants that match a preference provided by the selected user.

10. The method of claim 9, wherein the preference provided by the selected user includes an age range of the game play participants.

11. A non-transitory machine readable medium comprising computer-readable instructions, the instructions operable with a computer to perform operations comprising:
    receiving game play information pertaining to one or more computer-implemented online games, at a server, from devices coupled to the server, wherein each device is associated with at least one of a group of users;
    generating a recommendation of a potential connection from the group of users for a selected user in a social network based at least in part on:
       user profile information maintained for the selected user;

the game play information associated with the group of users; and respective game-play states of a set of players comprising one of:
- a plurality of players in a gameplay graph of the selected user, the gameplay graph being an in-game social graph for an associated game; or
- a plurality of players in a social graph of the selected user, the social graph being an out-of-game network or users;

providing the recommendation to the selected user for accepting, at a device in communication with the server, wherein the recommendation includes a portion of the game play information associated with the potential connection; and responsive to receiving acceptance by the selected user of the recommendation with respect to a candidate user indicated by the potential connection, establishing a connection between the selected user and the accepted user within the social network.

12. The non-transitory machine readable medium of claim 11, comprising computer-readable instructions to:
receive connection data from a contact list outside of a social network or a gaming network.

13. The non-transitory machine readable medium of claim 11, comprising computer-readable instructions to:
generate the potential connection recommendation based at least in part on a game play frequency.

14. The non-transitory machine readable medium of claim 11, comprising computer-readable instructions to:
maintain separate social networks for a plurality of games offered in a game networking system.

15. A computing system, comprising:
a storage module configured to store game play data pertaining to one or more computer-implemented online games, at a server, from devices coupled to the server, wherein each device is associated with at least one of a group of users;

a connection recommendation module configured to:
generate a recommendation of a potential connection from the group of users for a selected user in a social network based at least in part on:
- user profile information maintained for the selected user;
- the game play information associated with the group of users; and
- respective game-play states of a plurality of players in a gameplay graph of the selected user, the gameplay graph being an in-game social graph for an associated game;

provide a recommendation to the selected user for acceptance of a recommended connection indicated by the recommendation, wherein the recommendation includes a portion of the game play data associated with the recommended connection; and responsive to receiving acceptance by the selected user of the recommended connection, establishing a connection between the selected user and the recommended connection within the gaming social network.

16. The system of claim 15, wherein the game play data includes reputation data.

17. The system of claim 15, further comprising:
a connection to a social network separate from the gaming social network,
a communication module configured to receive and process game play and user data communications from the social network.

18. The system of claim 17, wherein the recommendation indicated as recommended connections candidate users which are participating in a game the selected user is playing, the candidate users including both users that are members of the gaming social network and users that are members of the social network.

19. The system of claim 17, wherein the connection recommendation module receives a first social graph from the social network, and is configured to generate recommended connections based on the first social graph.

* * * * *

UNITED STATES PATENT AND TRADEMARK OFFICE
CERTIFICATE OF CORRECTION

PATENT NO. : 11,123,643 B2
APPLICATION NO. : 16/577659
DATED : September 21, 2021
INVENTOR(S) : Hall et al.

It is certified that error appears in the above-identified patent and that said Letters Patent is hereby corrected as shown below:

In the Specification

In Column 2, Line 58, delete "gamming" and insert --gaming-- therefor

In Column 3, Line 8, delete "gamming" and insert --gaming-- therefor

In Column 3, Line 31, delete "gamming" and insert --gaming-- therefor

In Column 6, Line 30, delete "graph," and insert --graph;-- therefor

In Column 8, Line 53, delete "player," and insert --player;-- therefor

In Column 9, Line 33, delete "412," and insert --412;-- therefor

In Column 23, Line 19, delete "criteria." and insert --criteria,-- therefor

In the Claims

In Column 36, Line 41, in Claim 6, after "comprising", insert a linebreak

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*